US012435357B2

(12) United States Patent
Rabinowitz et al.

(10) Patent No.: US 12,435,357 B2
(45) Date of Patent: Oct. 7, 2025

(54) DIAGNOSTIC DEVICE FOR DETECTING A TARGET NUCLEIC ACID MOLECULE IN A BIOLOGICAL SAMPLE

(71) Applicant: KANSO DIAGNOSTICS LTD., Ramat Gan (IL)

(72) Inventors: Roy Rabinowitz, Tel Aviv-Jaffa (IL); Omer Stoller, Ramat Gan (IL)

(73) Assignee: KANSO DIAGNOSTICS LTD., Ramat Gan (IL)

( * ) Notice: Subject to any disclaimer, the term of this patent is extended or adjusted under 35 U.S.C. 154(b) by 0 days.

(21) Appl. No.: 18/087,147

(22) Filed: Dec. 22, 2022

(65) Prior Publication Data

US 2024/0209418 A1   Jun. 27, 2024

(51) Int. Cl.
*B01L 3/00* (2006.01)
*C12Q 1/6816* (2018.01)
(Continued)

(52) U.S. Cl.
CPC ...... *C12Q 1/6816* (2013.01); *B01L 3/502761* (2013.01); *C12Q 1/6844* (2013.01);
(Continued)

(58) Field of Classification Search
CPC .............. B01L 2300/0861; B01L 2400/0622
See application file for complete search history.

(56) References Cited

U.S. PATENT DOCUMENTS 10,611,827 B2   4/2020   Aman et al.
11,021,740 B2   6/2021   Abudayyeh et al.
(Continued)

FOREIGN PATENT DOCUMENTS

WO   2017218573 A1   12/2017
WO   2017219027 A1   12/2017
(Continued)

OTHER PUBLICATIONS

Chen JS, Ma E, Harrington LB, Da Costa M, Tian X, Palefsky JM, Doudna JA. CRISPR-Cas 12a target binding unleashes indiscriminate single-stranded DNase activity. Science. Apr. 27, 2018;360(6387):436-439. doi: 10.1126/science.aar6245. Epub Feb. 15, 2018. Erratum in: Science. Feb. 19, 2021;371(6531): PMID: 29449511; PMCID: PMC6628903.
(Continued)

*Primary Examiner* — Natalia Levkovich
(74) *Attorney, Agent, or Firm* — The Roy Gross Law Firm, LLC; Roy D. Gross

(57) ABSTRACT

Diagnostic devices comprising: an inlet for receiving a solution comprising a biological sample comprising a target nucleic acid molecule; at least one reaction chamber, comprising a nuclease for cleaving a nucleic acid molecule, into a first portion bonded to a marker and a second portion bonded to a bulky molecule; a membrane in liquid connection to the at least one reaction chamber, having porosity sized to filter the first portion from the solution containing the second portion; and an informative chamber configured to receive the filtered first portion, having at least one of, a transparent region showing a visible marker; and a detector for detecting the marker are provided. Methods of using the devices to detect a target nucleic acid molecule in a sample are also provided.

16 Claims, 13 Drawing Sheets

(51) Int. Cl.
 *C12Q 1/6844* (2018.01)
 *C12Q 1/6869* (2018.01)
(52) U.S. Cl.
 CPC ...... *C12Q 1/6869* (2013.01); *B01L 2200/026* (2013.01); *B01L 2300/044* (2013.01); *B01L 2300/0681* (2013.01); *B01L 2300/0848* (2013.01); *B01L 2300/0861* (2013.01); *B01L 2400/0622* (2013.01)

(56) References Cited

U.S. PATENT DOCUMENTS

| | | | |
|---|---|---|---|
| 11,525,134 | B2 | 12/2022 | Van Den Boom et al. |
| 11,536,707 | B2 | 12/2022 | Sullivan et al. |
| 11,543,353 | B2 | 1/2023 | Qi et al. |
| 11,584,955 | B2 | 2/2023 | Wang et al. |
| 2006/0024757 | A1 | 2/2006 | Hussa et al. |
| 2006/0160243 | A1* | 7/2006 | Tang .................. G01N 1/40 436/177 |
| 2007/0042505 | A1 | 2/2007 | Israel et al. |
| 2007/0243137 | A1 | 10/2007 | Hainfeld |
| 2010/0062415 | A1 | 3/2010 | Schwoebel et al. |
| 2010/0294811 | A1* | 11/2010 | Akechi ............. B01L 3/502715 422/521 |
| 2012/0071342 | A1 | 3/2012 | Lochhead et al. |
| 2013/0203627 | A1 | 8/2013 | Moll et al. |
| 2016/0187333 | A1 | 6/2016 | Moll et al. |
| 2016/0228874 | A1 | 8/2016 | Lee et al. |
| 2018/0305773 | A1 | 10/2018 | Abudayyeh et al. |
| 2018/0356405 | A1 | 12/2018 | Chou |
| 2019/0321486 | A1 | 10/2019 | Zink et al. |
| 2019/0346435 | A1 | 11/2019 | Yanik et al. |
| 2020/0032325 | A1 | 1/2020 | Baughman et al. |
| 2020/0249228 | A1 | 8/2020 | Jiang et al. |
| 2020/0263167 | A1 | 8/2020 | Van Den Boom et al. |
| 2020/0299677 | A1 | 9/2020 | Van Den Boom et al. |
| 2021/0199651 | A1 | 7/2021 | Zenhausern et al. |
| 2021/0252150 | A1 | 8/2021 | Crowe, Jr. |
| 2021/0255172 | A1 | 8/2021 | Beskok et al. |
| 2021/0292721 | A1 | 9/2021 | Zhang et al. |
| 2021/0292823 | A1 | 9/2021 | Zhang et al. |
| 2021/0292824 | A1 | 9/2021 | Zhang et al. |
| 2022/0042910 | A1 | 2/2022 | Qi et al. |
| 2022/0044074 | A1 | 2/2022 | Li et al. |
| 2022/0072120 | A1 | 3/2022 | Kanekiyo et al. |
| 2022/0099675 | A1 | 3/2022 | Chen et al. |
| 2022/0106647 | A1 | 4/2022 | Baughman et al. |
| 2022/0162591 | A1 | 5/2022 | Van Den Boom et al. |
| 2022/0170071 | A1 | 6/2022 | Brown, III et al. |
| 2022/0289828 | A1 | 9/2022 | Crowe, Jr. et al. |
| 2022/0298203 | A1 | 9/2022 | Altschul et al. |

FOREIGN PATENT DOCUMENTS

| | | |
|---|---|---|
| WO | 2018064352 A1 | 4/2018 |
| WO | 2018107129 A1 | 6/2018 |
| WO | 2018170340 A1 | 9/2018 |
| WO | 2019010422 A1 | 1/2019 |
| WO | 2019018423 A1 | 1/2019 |
| WO | 2019051318 A1 | 3/2019 |
| WO | 2019089796 A1 | 5/2019 |
| WO | 2019089820 A1 | 5/2019 |
| WO | 2019104058 A1 | 5/2019 |
| WO | 2019126577 A2 | 6/2019 |
| WO | 2019126716 A1 | 6/2019 |
| WO | 2020006036 A1 | 1/2020 |
| WO | 2020006049 A1 | 1/2020 |
| WO | 2020006067 A1 | 1/2020 |
| WO | 2020028729 A1 | 2/2020 |
| WO | 2020142739 A1 | 7/2020 |
| WO | 2020142754 A2 | 7/2020 |
| WO | 2020186231 A2 | 9/2020 |
| WO | 2021046257 A1 | 3/2021 |
| WO | 2021163584 A1 | 8/2021 |

OTHER PUBLICATIONS

Gao P, Yang H, Rajashankar KR, Huang Z, Patel DJ. Type V CRISPR-Cas Cpf1 endonuclease employs a unique mechanism for crRNA-mediated target DNA recognition. Cell Res. Aug. 2016;26(8):901-13. doi: 10.1038/cr.2016.88. Epub Jul. 22, 2016. PMID: 27444870; PMCID: PMC4973337.

Ma E, Harrington LB, O'Connell MR, Zhou K, Doudna JA. Single-Stranded DNA Cleavage by Divergent CRISPR-Cas9 Enzymes. Mol Cell. Nov. 5, 2015;60(3):398-407. doi: 10.1016/j.molcel.2015. 10.030. PMID: 26545076; PMCID: PMC4636735.

East-Seletsky A, O'Connell MR, Knight SC, Burstein D, Cate JH, Tjian R, Doudna JA. Two distinct RNase activities of CRISPR-C2c2 enable guide-RNA processing and RNA detection. Nature. Oct. 13, 2016;538(7624):270-273. doi: 10.1038/nature19802. Epub Sep. 26, 2016. PMID: 27669025; PMCID: PMC5576363.

Gootenberg JS, Abudayyeh OO, Lee JW, Essletzbichler P, Dy AJ, Joung J, Verdine V, Donghia N, Daringer NM, Freije CA, Myhrvold C, Bhattacharyya RP, Livny J, Regev A, Koonin EV, Hung DT, Sabeti PC, Collins JJ, Zhang F. Nucleic acid detection with CRISPR-Cas13a/C2c2. Science. Apr. 28, 2017;356(6336):438-442. doi: 10.1126/science.aam9321. Epub Apr. 13, 2017. PMID: 28408723; PMCID: PMC5526198.

Singh, D. et al. Real-time observation of DNA target interrogation and product release by the RNA-guided endonuclease CRISPR Cpf1. (2017). bioRxiv 205575; doi: https://doi.org/10.1101/205575.

Sternberg SH, Redding S, Jinek M, Greene EC, Doudna Ja. DNA interrogation by the CRISPR RNA-guided endonuclease Cas9. Nature. Mar. 6, 2014;507(7490):62-7. doi: 10.1038/nature13011. Epub Jan. 29, 2014. PMID: 24476820; PMCID: PMC4106473.

Samai P, Pyenson N, Jiang W, Goldberg GW, Hatoum-Aslan A, Marraffini LA. Co-transcriptional DNA and RNA Cleavage during Type III CRISPR-Cas Immunity. Cell. May 21, 2015;161(5):1164-1174. doi: 10.1016/j.cell.2015.04.027. Epub May 7, 2015. PMID: 25959775; PMCID: PMC4594840.

Silva SJRD, Paiva MHS, Guedes DRD, Krokovsky L, Melo FL, Silva Mald, Silva AD, Ayres CFJ, Pena LJ. Development and Validation of Reverse Transcription Loop-Mediated Isothermal Amplification (RT-LAMP) for Rapid Detection of ZIKV in Mosquito Samples from Brazil. Sci Rep. Mar. 14, 2019;9(1):4494. doi: 10.1038/s41598-019-40960-5. PMID: 30872672; PMCID: PMC6418238.

Nath P, Kabir A, Khoubafarin Doust S, Kreais ZJ, Ray A. Detection of Bacterial and Viral Pathogens Using Photonic Point-of-Care Devices. Diagnostics (Basel). Oct. 19, 2020;10(10):841. doi: 10.3390/diagnostics10100841. PMID: 33086578; PMCID: PMC7603237.

Mustafa, M. I., & Makhawi, A. M. (2020). Sherlock and Detectr: CRISPR-Cas Systems as Potential Rapid Diagnostic Tools for Emerging Infectious Diseases. Journal of Clinical Microbiology. doi:10.1128/jcm.00745-20.

Sharma, A. and Changotra, H., 2018. Mutagenic primer-based PCR-RFLP assay for genotyping IRGM gene promoter variant rs4958843 (C/T). Journal of Clinical Laboratory Analysis, 32(4), p.e22346. doi: 10.1002/jcla.22346. Epub Nov. 26, 2017. PMID: 29178192; PMCID: PMC6816862.

Zhu, D., Wang, J., Yang, D., Xi, J. and Li, J., 2021. High-throughput profiling of Cas12a orthologues and engineered variants for enhanced genome editing activity. International Journal of Molecular Sciences, 22(24), p. 13301. doi: 10.3390/ijms222413301. PMID: 34948095; PMCID: PMC8706968.

Wang, X., Yang, T., Zhang, Y., Zeng, Z., Wei, Q., Chen, P., Yang, S., Huang, Y., Zhang, Y., Lu, H. and Wu, L., 2024. Optimization and Clinical Application Potential of Single Nucleotide Polymorphism Detection Method Based on CRISPR/Cas12a and Recombinase Polymerase Amplification. Analytical Chemistry, 96(44), pp. 17567-17575. doi: 10.1021/acs.analchem.4c03288. Epub Oct. 22, 2024. PMID: 39439116.

* cited by examiner

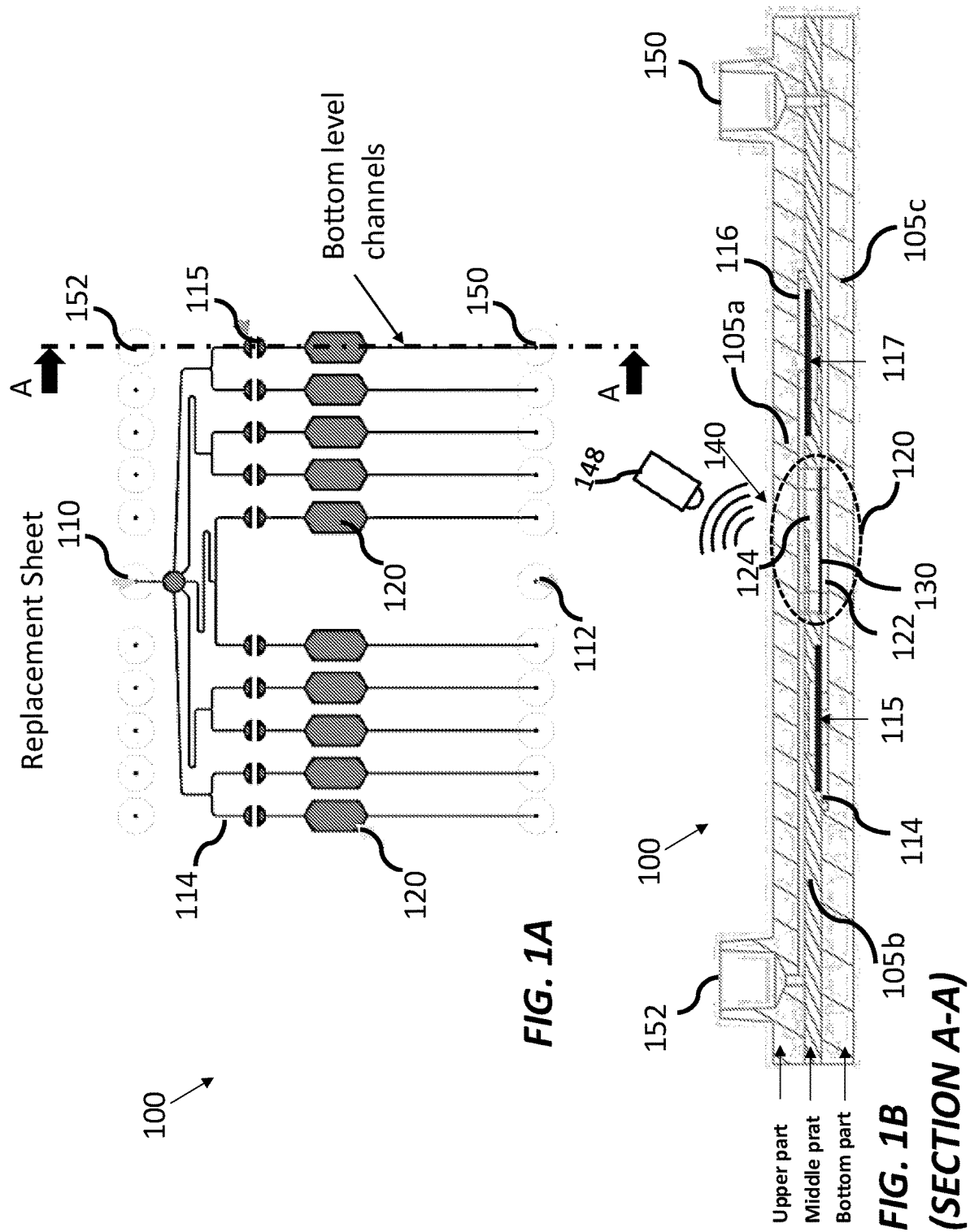

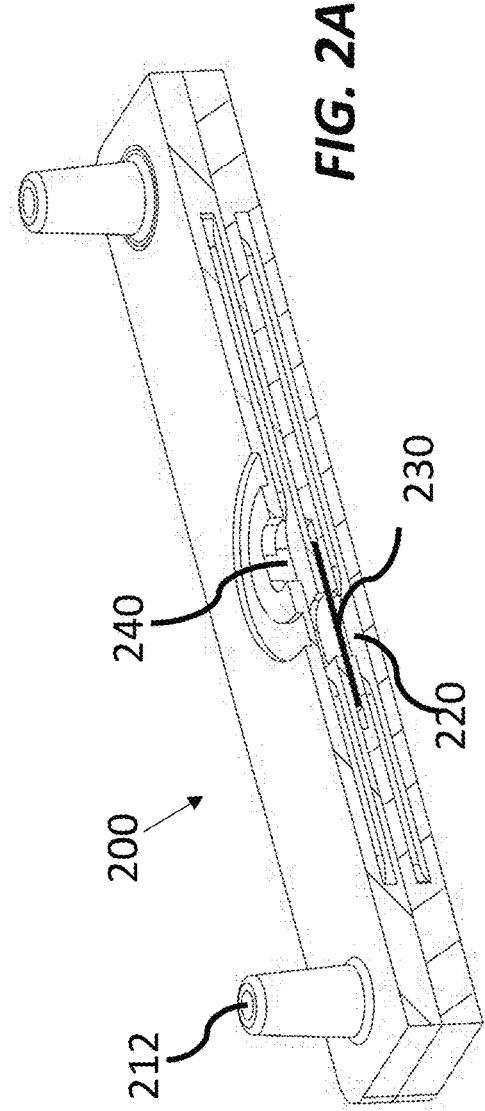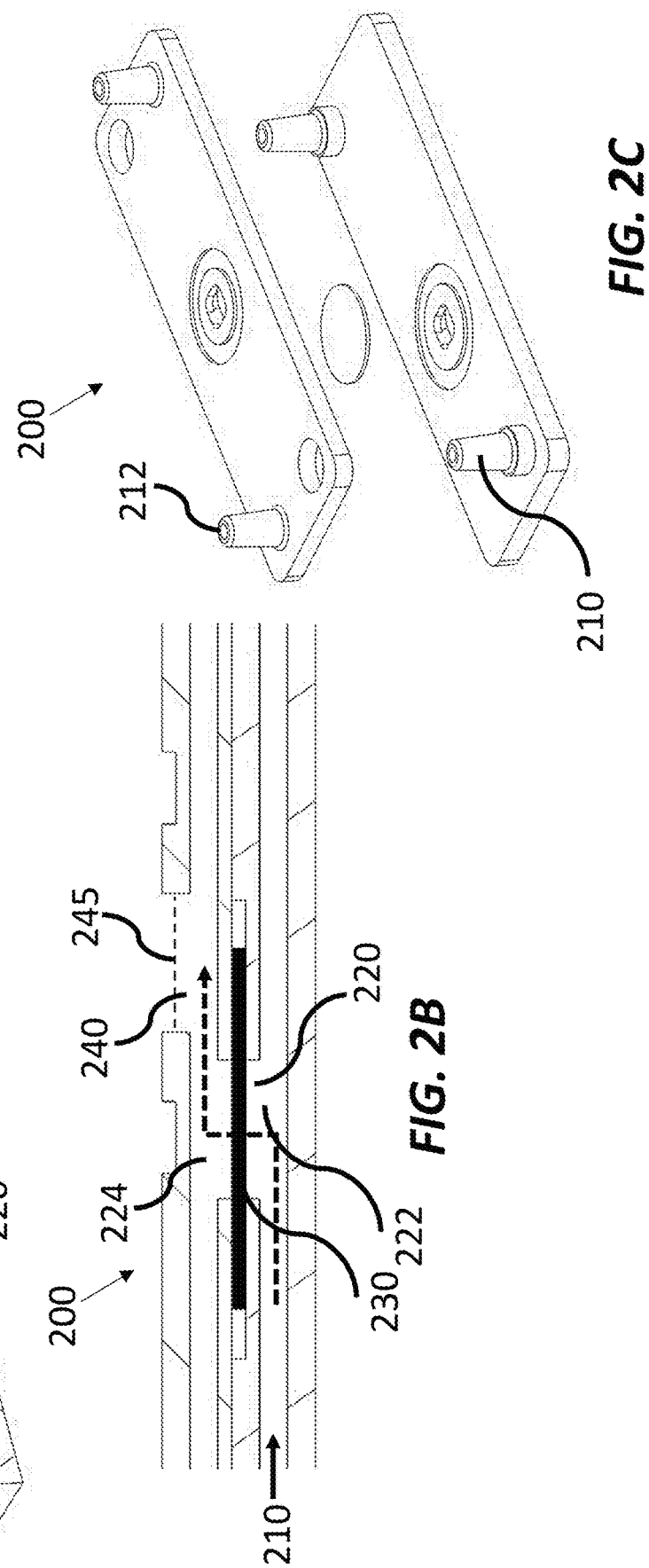

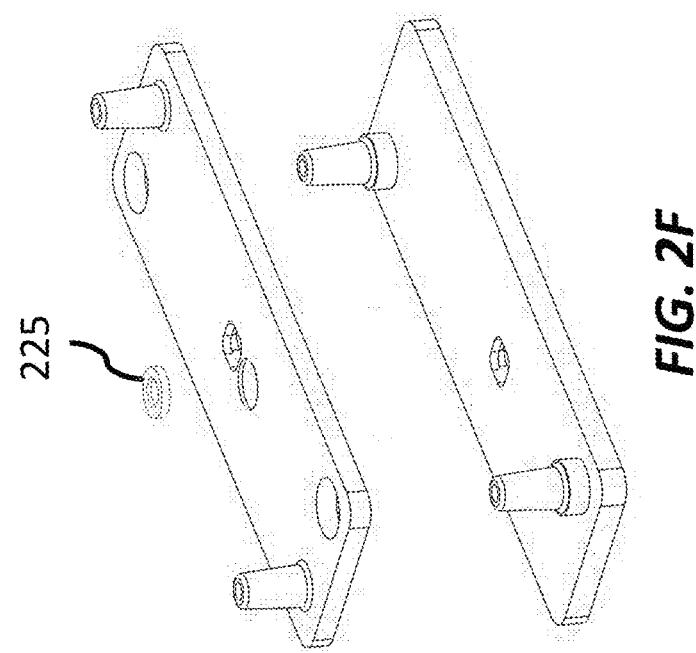
FIG. 2F
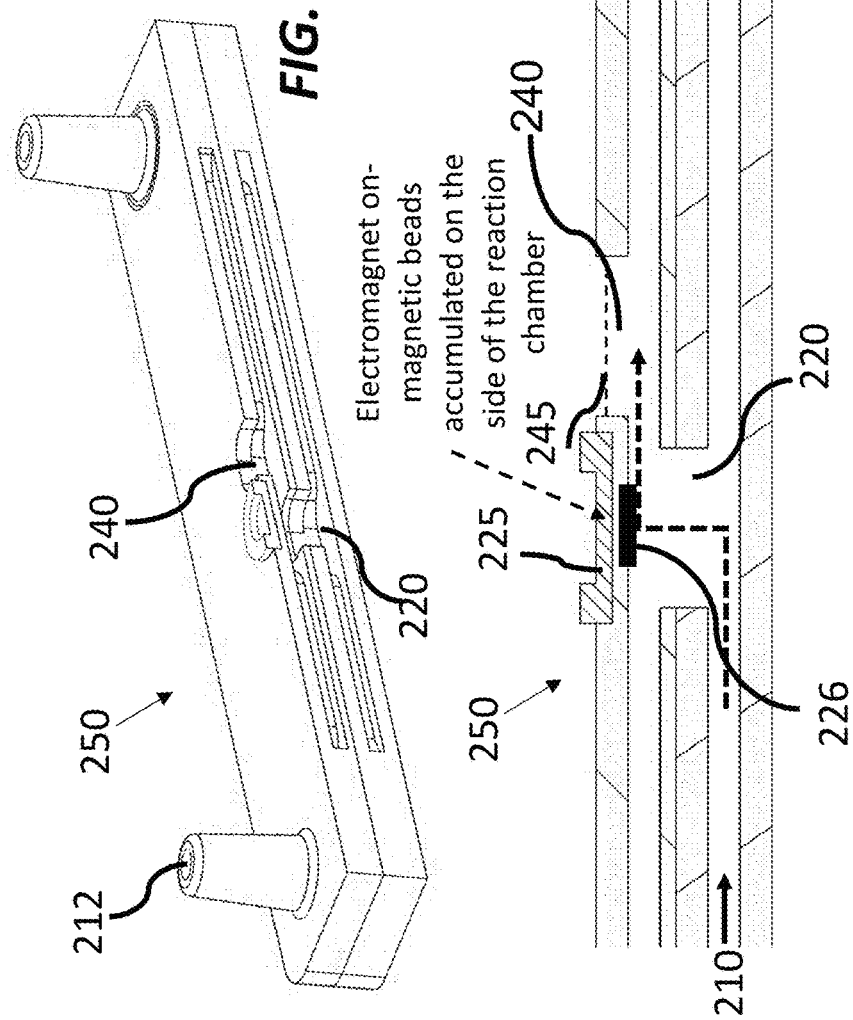
FIG. 2D
FIG. 2E

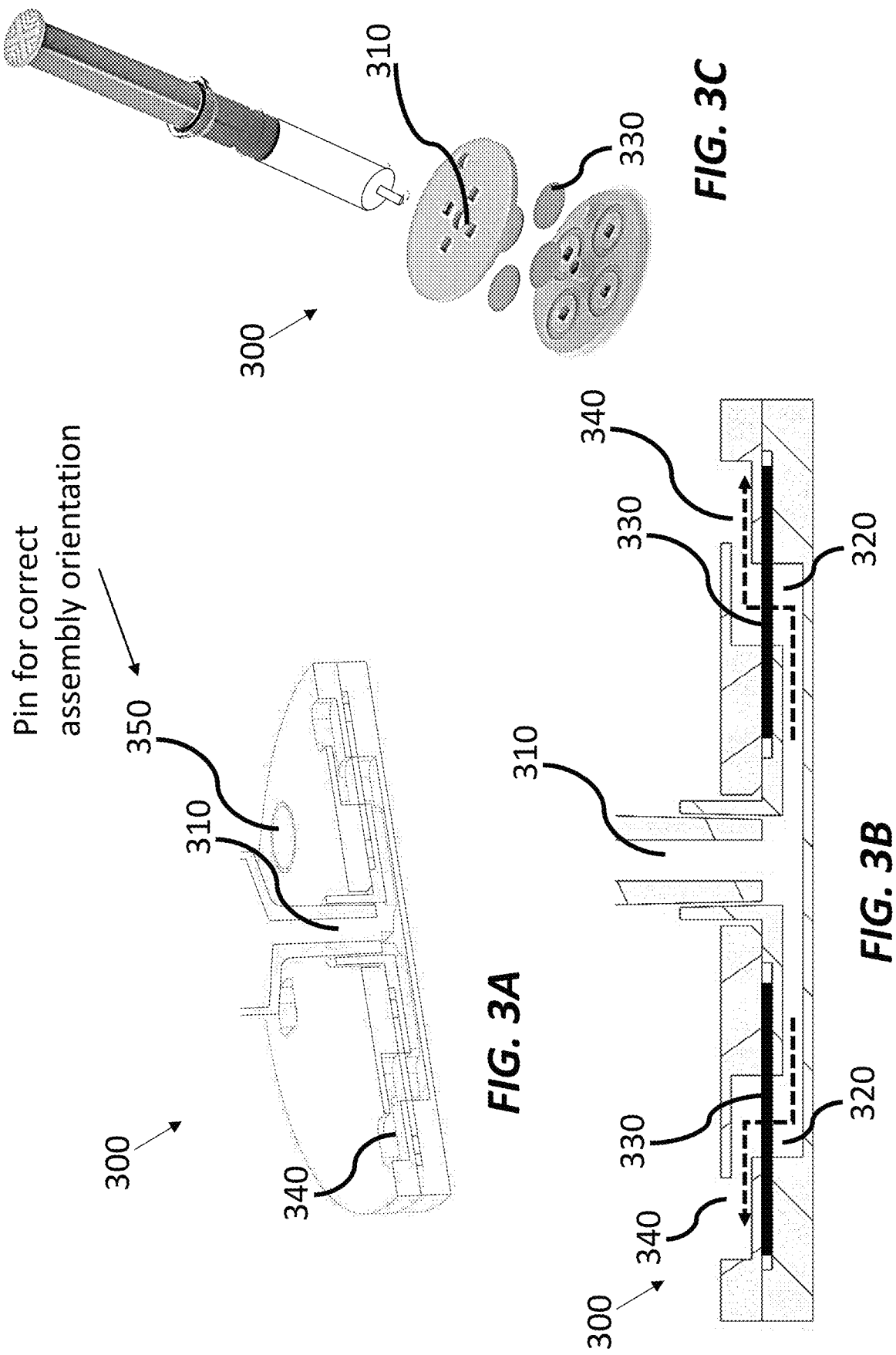

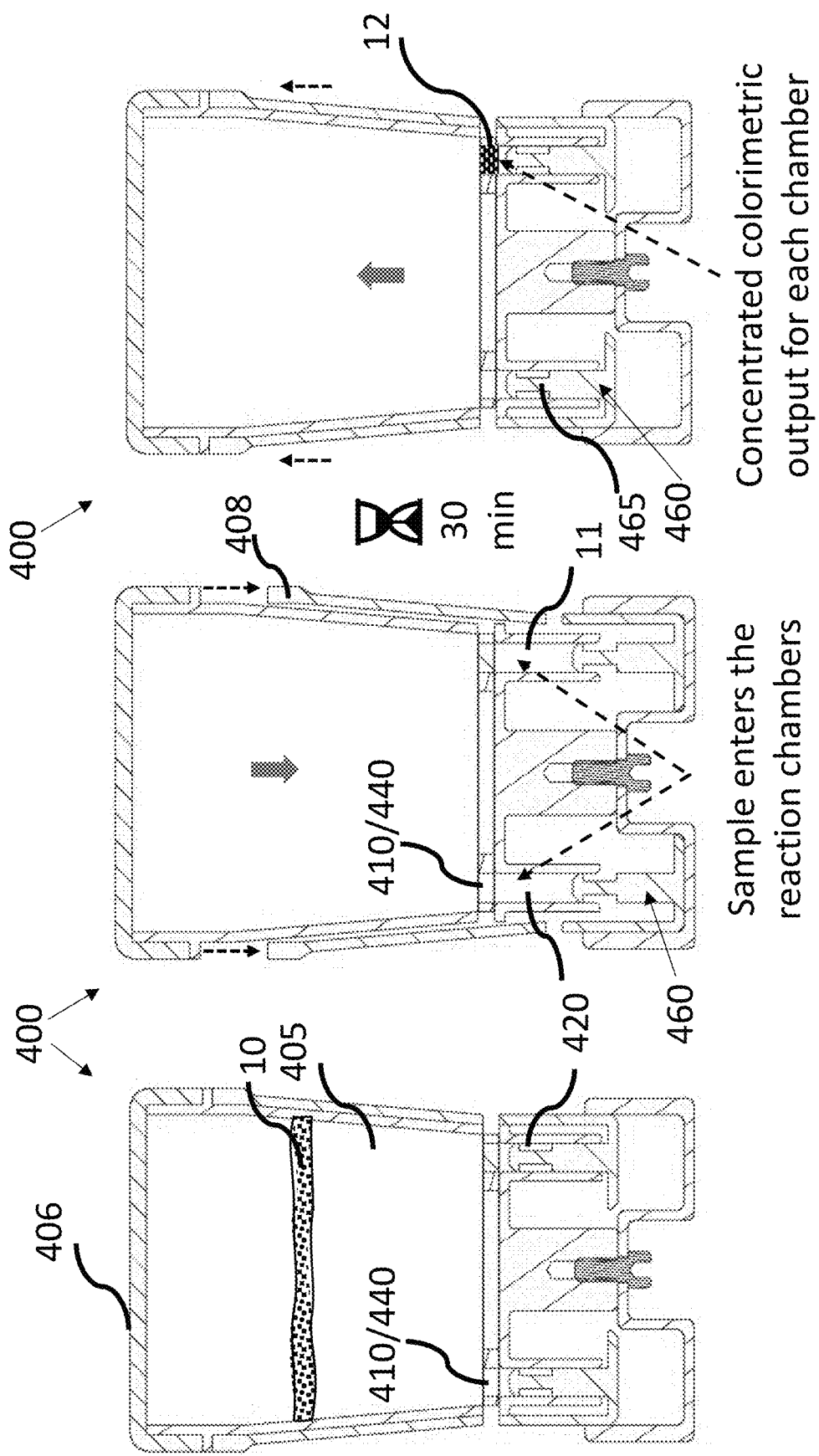

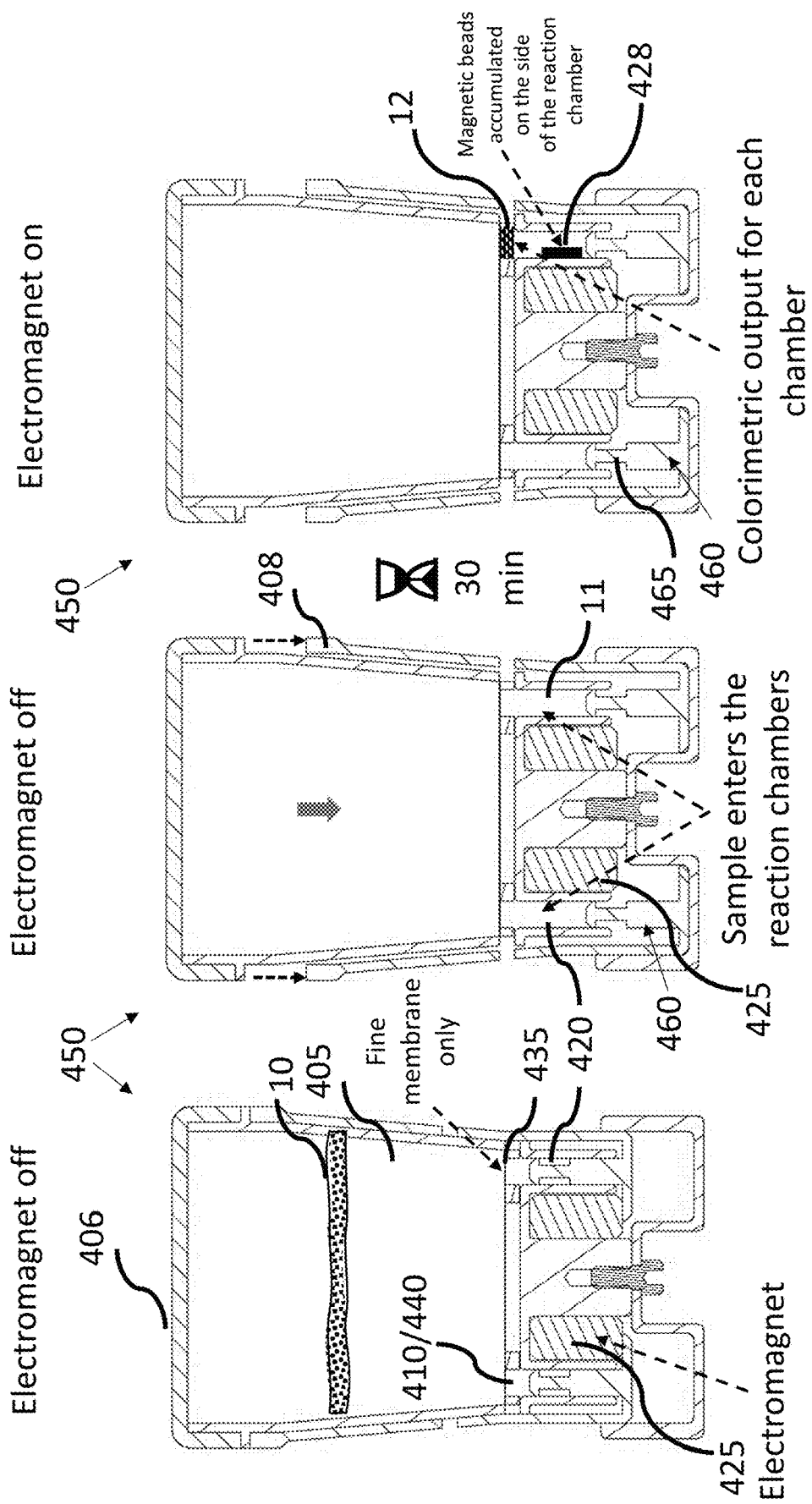

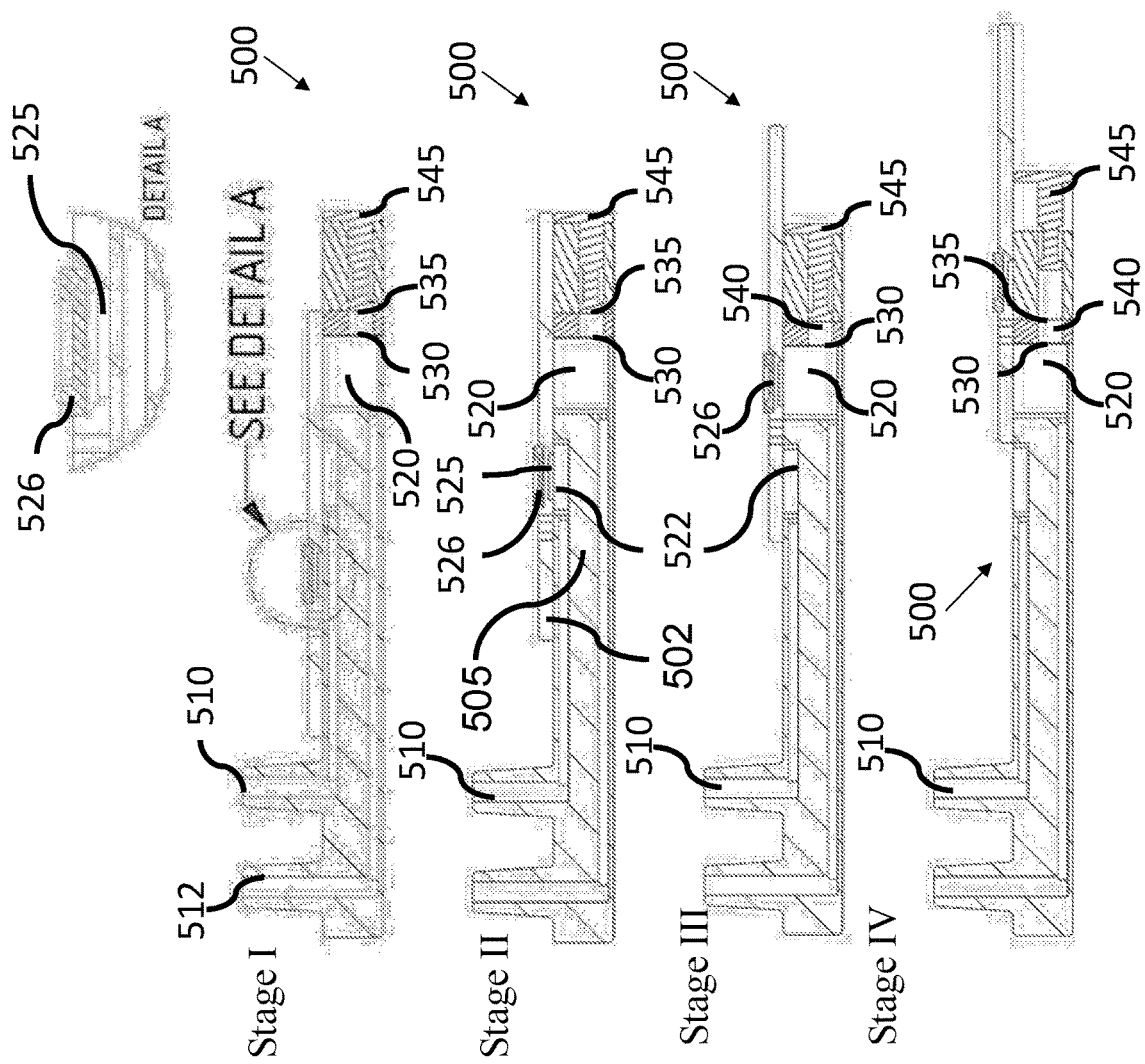
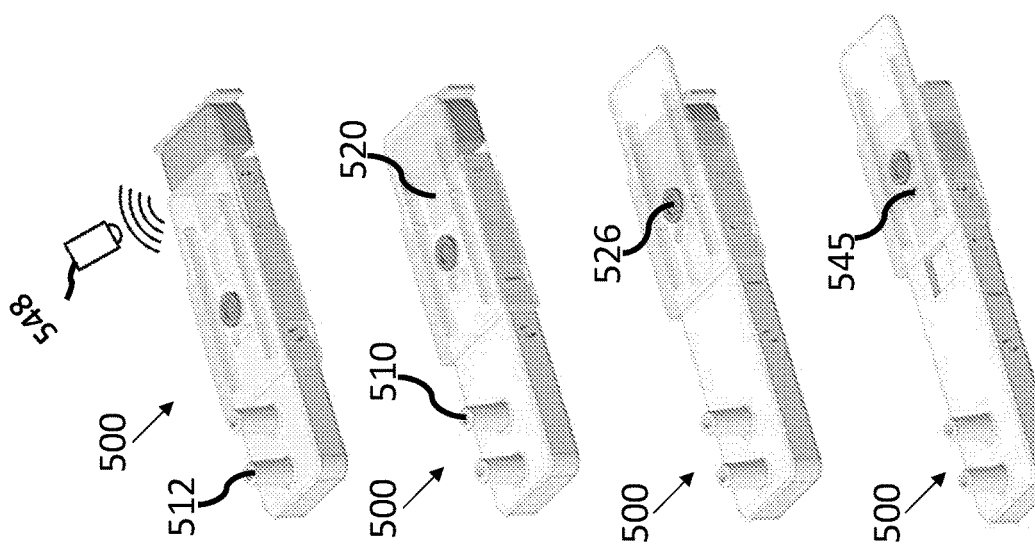
FIG. 6B
FIG. 6A

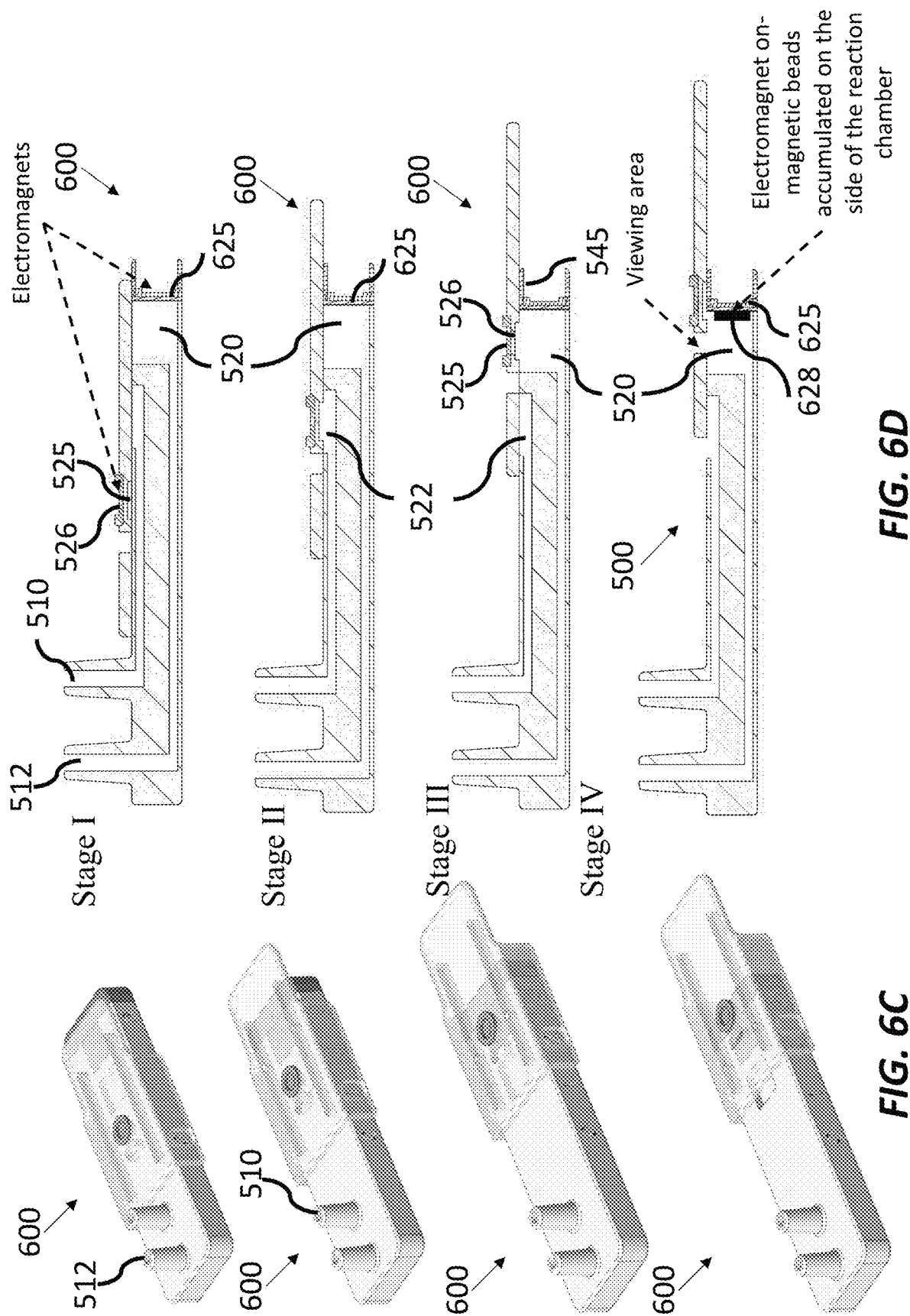

DIAGNOSTIC DEVICE FOR DETECTING A TARGET NUCLEIC ACID MOLECULE IN A BIOLOGICAL SAMPLE

FIELD OF THE INVENTION

The present invention relates generally to diagnostic methods and devices. More specifically the present invention relates to diagnostic methods and devices for detecting a target nucleic acid molecule in a biological sample.

BACKGROUND OF THE INVENTION

Rapid diagnostics have a great potential in many fields, including detection of pathogens (infectious diseases), agricultural pests, genetic variants and more. Enabling rapid molecular testing technologies allow improved accuracy and response-time of treatment decisions. Lab-on-a-chip (LOC) designs implement biological workflows within a compact device, which does not require laboratory equipment and facilities. Existing technologies incorporate processes such as PCR amplification on a LOC. However, PCR may have insufficient specificity to detect small changes such as point mutations (genetic variants and antibiotic resistance mutations). Moreover, the number of amplified sequences (amplicons) tends to be insufficient to produce a detectable signal. Thus, methods involving a trans-activation of a signal have the advantage of signal amplification. CRISPR diagnostics methods (i.e., SHERLOCK and DETECTR) employ such CRISPR-Cas nucleases with a non-specific co-lateral activity that act as a molecular switch upon target sequence recognition. Improved diagnostic methods and LOCs are greatly needed.

SUMMARY OF THE INVENTION

Some aspects of the invention are directed to a diagnostic device, comprising: an inlet for receiving a solution comprising a biological sample comprising a target nucleic acid molecule; at least one reaction chamber, comprising a nuclease for cleaving a nucleic acid molecule, into a first portion bonded to a marker and a second portion bonded to a bulky molecule; a membrane in liquid connection to the at least one reaction chamber, having porosity sized to filter the first portion from the solution containing the second portion; and an informative chamber configured to receive the filtered first portion, having at least one of, a transparent region showing a visible marker; and a detector for detecting the marker.

In some embodiments, the diagnostic device comprises a first reaction chamber, in liquid connection to the inlet, comprising the bulky molecules; and a second reaction chamber, in liquid connection to the first reaction chamber, comprising the nuclease. In some embodiments, the bulky molecules are bonded to the target nucleic acid molecule within the first reaction chamber and the target nucleic acid molecule is cleaved from the bulky molecule in the second reaction chamber. In some embodiments, said target nucleic acid molecule comprises a capture moiety and said bulky molecules comprise a capturing moiety and wherein said capture moiety and capturing moiety are configured to bind to each other. In some embodiments, said capture moiety comprises biotin and said capturing moiety comprises avidin, streptavidin or neutravidin.

In some embodiments, the nuclease is specific to a sequence within the target nucleic acid molecule. In some embodiments, the nuclease is selected from a sequence specific restriction enzyme, TALEN enzymes, zinc finger nuclease and a CRISPR-Cas complex comprising a guide RNA reverse complementary to said sequence within the target nucleic acid molecule.

In some embodiments, the first reaction chamber further comprises a solution containing single stranded DNA/RNA probes, each bonded to the marker and the bulky molecule, and wherein the nuclease is configured to cleave the single stranded DNA probes only in the presence of the target nucleic acid molecule. In some embodiments, the nuclease is a CRISPR-Cas complex comprising a type V or type VI Cas comprising non-specific nuclease activity. In some embodiments, said type V or VI Cas is selected from Cas12, Cas13, Cas14 and variants, homologs or derivates thereof comprising non-specific nuclease activity.

In some embodiments, the diagnostic device comprises a plurality of reaction chambers, wherein each reaction chamber of said plurality comprises a nuclease specific to a different target nucleic acid sequence or configured to cleave the DNA/RNA probes in the presence of a different target nucleic acid molecule. In some embodiments, the diagnostic device comprises a single first reaction chamber comprising the bulky molecules; and a plurality of second reaction chambers, in liquid connection to the single first reaction chamber, wherein each reaction chamber of said plurality comprises a nuclease specific to a different target nucleic acid sequence or configured to cleave the DNA/RNA probes in the presence of a different target nucleic acid molecule.

In some embodiments, the diagnostic device comprises a unidirectional valve located at an entrance to each reaction chamber.

In some embodiments, the diagnostic device comprises a flat body configured to hold, the inlet, the at least one reaction chamber, the membrane and the informative chamber. In some embodiments, the thickness of the flat body is between 1 to 100 mm.

In some embodiments, said informative chamber is above said at least one reaction chamber and shifted horizontally or vertically such that detection of said marker in said informative chamber does not detect marker in said at least one reaction chamber.

In some embodiments, the diagnostic device comprises a container for collecting the solution comprising the biological sample, and a sample provision mechanism for controllable delivery of a controlled amount of the solution via the inlet to said at least one reaction chamber and wherein said membrane is located between said inlet and said at least one reaction chamber. In some embodiments, the diagnostic device comprises an additional membrane, located between said inlet and said container and configured to filter the target nucleic acid molecule from the solution, prior to entering said inlet. In some embodiments, the sample provision mechanism includes one or more pistons, each being located inside a corresponding reaction chamber and configured to introduce a filtered solution containing said target nucleic acid molecule into said at least one reaction chamber and to extract said solution comprising said first portion from said reaction chamber back into the inlet, and wherein the inlet is the informative chamber.

In some embodiments, the diagnostic device comprises a first chamber formed between a slidable element sliding over a body of the diagnostic device and wherein the inlet is located at an entrance between the slidable element and a wall of the body. In some embodiments, the first chamber comprises a polymerase and primers comprising a capture moiety, wherein said primers comprise a sequence capable of hybridizing to said target nucleic acid molecule. In some embodiments, said first chamber comprises primers comprising said marker. In some embodiments, the first chamber comprises magnetic beads comprising a capturing moiety, optionally wherein said magnetic bead is a magnetic bulky molecule. In some embodiments, the diagnostic device comprises a magnetic bead reservoir for introducing magnetic beads into the first chamber comprising the solution comprising the biological sample, by sliding the slidable element to position the magnetic bead reservoir in fluid contact with said first chamber, optionally wherein said magnetic beads comprise a capturing moiety. In some embodiments, the diagnostic device comprises an electromagnet located in the slidable element located at the same location as the magnetic bead reservoir. In some embodiments, the diagnostic device comprises at least one second reaction chamber comprising the nuclease located after the first reaction chamber in the body in the sliding direction. In some embodiments, the diagnostic device comprises a piston capable of drawing fluid through said membrane and into said informative chamber.

Some additional aspects of the invention are directed to a method of detecting a target nucleic acid molecule in a sample, the method comprising applying said sample to a diagnostic device of the invention via said inlet and detecting said marker in said informative chamber, thereby detecting a target nucleic acid molecule in a sample.

In some embodiments, said sample is from a subject, said target nucleic acid molecule is from a pathogen and said method is a method of diagnosing pathogenic infection of said subject or said target DNA is genomic DNA from said subject and said method is a method of identifying a genomic variation. In some embodiments, said diagnostic device is a diagnostic device of the invention and comprises a plurality of second chambers each comprising a nuclease specific to a target nucleic acid sequence of a different pathogen or configured to cleave the DNA probes in the presence of a target nucleic acid molecule of a different pathogen and wherein said method is a method of simultaneously testing and diagnosing infection by a plurality of pathogens. In some embodiments, wherein said nucleic acid molecule is:

i. a DNA or RNA molecule;
  ii. from a pathogen selected from: a virus, a bacterium, a fungi and a parasite; or
  iii. both (a) and (b).

In some embodiments, the method comprises prior to said applying amplifying at least a portion of said target nucleic acid molecule or amplifying at least a portion of said target nucleic acid molecule within said first reaction chamber. In some embodiments, said amplifying is performed with primers or nucleotides comprising a capture moiety, and wherein said bulky molecule comprise a capturing moiety and wherein said capture moiety and said capturing moiety are configured to bind to each other. In some embodiments, said amplifying is performed with primers or nucleotides comprising said marker.

In some embodiments, said diagnostic device is a diagnostic device according to any one of the embodiments discloses herein, and wherein said method comprises: i) amplifying at least a portion of said target nucleic acid molecule in said first chamber to produce an amplified first portion of said target nucleic acid molecule or applying a sample comprising an amplified first portion of said target nucleic acid molecule to said first chamber; ii) sliding said slidable element to place said magnetic bead reservoir in fluid contact with said first chamber such that said magnetic beads come in contact with and bind to said amplified first portion of said target nucleic acid molecule to produce an amplified first portion of said target nucleic acid molecule bound to a magnetic bead; iii) activating said electromagnet when in fluid contact with said first chamber comprising said amplified first portion of said target nucleic acid molecule bound to a magnetic bead such that said magnetic bead magnetizes to said electromagnet; and iv) sliding said slidable element while said electromagnet is active to place said electromagnet magnetized to said magnetic beads in fluid contact with said second reaction chamber.

In some embodiments, the method may include deactivating said electromagnet such that said magnetic beads diffuse into a fluid in said second reaction chamber. In some embodiments, the method may include drawing back a piston to pull fluid from said second reaction chamber through said membrane and into said informative chamber.

Some additional aspects of the invention are directed to: a diagnostic device, comprising: an inlet for receiving a solution comprising a biological sample comprising a target nucleic acid molecule; at least one reaction chamber comprising a nuclease for cleaving a nucleic acid molecule, into a first portion bonded to a marker and a second portion bonded to a bulky molecule; a separation unit in liquid connection to the at least one reaction chamber, configured to separate the first portion from the second portion in the solution; and an informative chamber configured to receive a solution containing the separated first portion, having at least one of, a transparent region showing a visible marker; and a detector for detecting the marker.

In some embodiments, the second portion is bonded to magnetic beads, and wherein the separation unit includes: at least one electromagnet configured to capture the magnetic beads, thus separating the second portion from the first portion. In some embodiments, the device comprises a first chamber formed between a slidable element sliding over a body of the diagnostic device and wherein the inlet is located at an entrance between the slidable element and a wall of the body; and a magnetic beads reservoir for introducing magnetic beads into the first chamber comprising the solution comprising the biological sample, by sliding the slidable element to position the magnetic bead reservoir in fluid contact with said first chamber, optionally wherein said magnetic beads comprise a capturing moiety.

In some embodiments, the first chamber comprises a polymerase and primers comprising a capture moiety, wherein said primers comprise a sequence capable of hybridizing to said target nucleic acid molecule. In some embodiments, said first chamber comprises primers comprising said marker. In some embodiments, the device further includes at least one second reaction chamber comprising the nuclease located after the first reaction chamber in the body in the sliding direction.

In some embodiments, the device includes a first electromagnet located at the slidable element and configured to slide from the first chamber to the second chamber while carrying the magnetic beads; and a second electromagnet attached to the second chamber, wherein the second electromagnet is activated after the first electromagnet is deactivated.

In some embodiments, the separation unit includes a membrane in liquid connection to the at least one reaction chamber, having porosity sized to filter the first portion from the solution containing the second portion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A, 1B, and 1C are illustrations of an internal top view, a cross-section and an exploded view of a diagnostic device according to some embodiments of the invention;

FIGS. 2A, 2B, and 2C are illustrations of a perspective cross-section view, a cross-section view and an exploded view of a diagnostic device comprising a membrane according to some embodiments of the invention;

FIGS. 2D, 2E, and 2F are illustrations of a perspective cross-section view, a cross-section view and an exploded view of a diagnostic device comprising an electromagnet according to some embodiments of the invention;

FIGS. 3A, 3B, and 3C are illustrations of a perspective cross-section view, a cross-section view and an exploded view of another diagnostic device according to some embodiments of the invention;

FIGS. 4A, 4B and 4C are cross-section views of container diagnostic devices comprising a membrane according to some embodiments of the invention;

FIGS. 5A, 5B and 5C are cross-section views of container diagnostic devices comprising an electromagnet according to some embodiments of the invention;

FIGS. 6A and 6B are illustrations of perspective views and cross-section views of a slidable diagnostic device comprising a membrane, during different operation stages, according to some embodiments of the invention; and FIGS. 6C and 6D are illustrations of perspective views and cross-section views of a slidable diagnostic device comprising two electromagnets, during different operation stages, according to some embodiments of the invention.

Figure 1C:
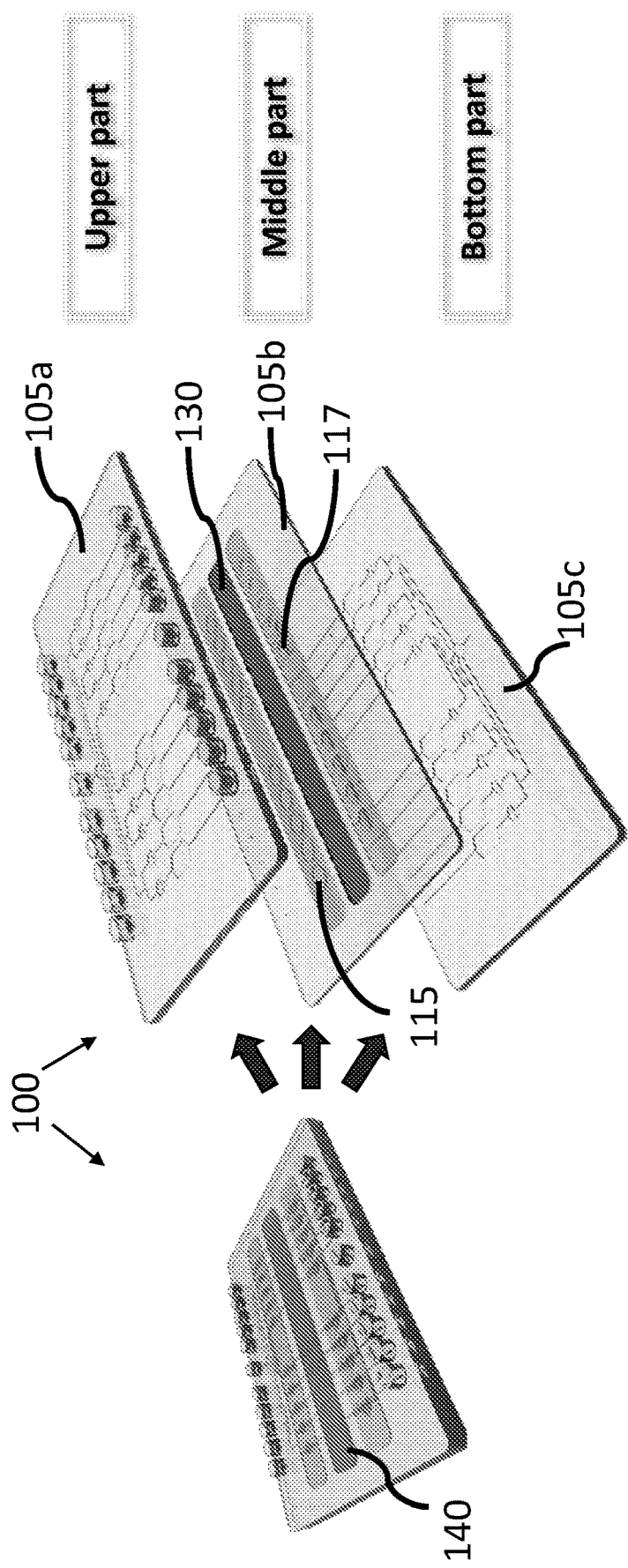

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention is based, at least in part, in the surprising discovery of a rapid and accurate diagnostics platform that can be used without expensive or hard-to-find equipment that can determine the presence of specific nucleic acid molecules (e.g., a pathogen, or genetic variant) in a sample. The platform can be used anywhere and does not require a laboratory, allowing for on-site diagnosis without sample collection and transportation. Further, the platform's unique design allows for the simultaneous and rapid detection of multiple pathogens/genetic variants from a single sample.

Accordingly, the diagnostic device according to embodiments of the invention may allow simple detection of a target nucleic acid molecule in a biological sample. Such devices can be operated by a nonprofessional user, domestically such that the received result can be understood (YES/NO) by the domestic user. The diagnostic device may include nuclease for cleaving the nucleic acid molecule. In some embodiments, the device may further include a marker to be bonded to a portion of the cleaved nucleic acid molecule. The marker may be detectable by one of: visibility via a transparent region in the device, or by a detector associated with the device. Therefore, reaction chambers for the device may include the nuclease and the markers.

As used herein, a "separation unit" may include any component/element/device that allows to separate the first portion of a cleaved nucleic acid molecule from the second portion of a cleaved nucleic acid molecule in a solution. For example, the separation unit may include a membrane having porosity sized to filter the first portion from the solution containing the second portion. In yet another example, the separation unit may include magnetic beads configured to be bonded to the second portion, and an electromagnet for capturing the magnetic beads.

Reference is now made to FIGS. 1A, 1B, and 1C which are illustrations of an internal top view, a cross-section view, and an exploded view, respectively, of a diagnostic device according to some embodiments of the invention. In some embodiments, a device 100 may include an inlet 110 for receiving a solution comprising a biological sample comprising a target nucleic acid molecule and at least one reaction chamber 120, in liquid connection to inlet 110, comprising a nuclease for cleaving a nucleic acid molecule, into a first portion 125 (illustrated in FIG. 1D) bonded to a marker and a second portion 123 (illustrated in FIG. 1D) bonded to a bulky molecule. In some embodiments, the device may further include a membrane 130 in liquid connection to at least one reaction chamber 120, having porosity sized to filter the first portion 125 from the solution containing second portion 123. Membrane 130 may act as a separation unit configured to separate first portion 125 from second portion 123 in the solution. Therefore, membrane 130 and the size of the bulky molecules are selected such that membrane 130 will filter out all the molecules bonded to the bulky molecules. In some nonlimiting examples, membrane 130 may include or may be made from: Polydimethylsiloxane (PDMS), Polytetrafluoroethylene (PTFE). Polyethersulfone, nylon, regenerated cellulose, PVDF, alumina based, cellulose acetate, polypropylene, anopore, cellulose, polysulfone, and the like.

In a nonlimiting example, device 100 may include a body 105 made from three levels, body upper part 105a, body middle part 105b, and body lower part 105c. When assembled together, as illustrated in FIGS. 1B and 1C, upper part 105a, middle part 105b, and lower part 105c, form inlet 110, at least one reaction chamber 120, and an outlet 150. In some embodiments, membrane 130 is included in body middle part 105b.

In some embodiments, the sample is a biological sample. In some embodiments, the sample is a tissue sample. In some embodiments, the sample is a biological fluid. In some embodiments, the sample comprises a bodily fluid. In some embodiments, the bodily fluid is selected from: blood, serum, plasma, gastric fluid, intestinal fluid, saliva, bile, tumor fluid, breast milk, urine, interstitial fluid, cerebral spinal fluid, mucus and stool. In some embodiments, the bodily fluid is blood. In some embodiments, the blood is peripheral blood. In some embodiments, the bodily fluid is urine. In some embodiments, the bodily fluid is saliva. In some embodiments, the bodily fluid is mucus. In some embodiments, the sample comprises cells. In some embodiments, the sample comprises cells from a subject diluted in a buffer. In some embodiments, the cells are from a swab of the subject. It will be understood that a swab can be from any location on the subject from which a sample is desired. Possible locations include the nose, the mouth or a wound. In some embodiments, the cells are from an infectious organism. In some embodiments, the organism is a bacterium. In some embodiments, the organism is a virus or other mobile genetic element. In some embodiments, the sample comprises nucleic acid molecules. In some embodiments, the nucleic acids are DNA. In some embodiments, the nucleic acids are RNA. In some embodiments, the sample is from a subject.

The term "nucleic acid" is well known in the art. A "nucleic acid" as used herein will generally refer to a molecule (i.e., a strand) of DNA, RNA or a derivative or analog thereof, comprising a nucleobase. A nucleobase includes, for example, a naturally occurring purine or pyrimidine base found in DNA (e.g., an adenine "A," a guanine "G," a thymine "T" or a cytosine "C") or RNA (e.g., an A, a G, an uracil "U" or a C).

The term "nucleic acid molecule" includes but is not limited to single-stranded RNA (ssRNA), double-stranded RNA (dsRNA), single-stranded DNA (ssDNA), double-stranded DNA (dsDNA), small RNA such as miRNA, siRNA and other short interfering nucleic acids, snoRNAs, snRNAs, tRNA, piRNA, tnRNA, small rRNA, hnRNA, circulating nucleic acids such as cell-free DNA (cfDNA), cell-free fetal DNA (cfDNA), and circulating tumor DNA (ctDNA), fragments of genomic DNA or RNA, degraded nucleic acids, ribozymes, viral RNA or DNA, nucleic acids of infectious origin, amplification products, modified nucleic acids, plasmidical or organellar nucleic acids and artificial nucleic acids such as oligonucleotides. Nucleic acid molecules may be modified or unmodified such as by methylation or other epigenetic marks. In some embodiments, the nucleic acids are of infectious origin.

In some embodiments, membrane 130 may divide reaction chamber 120 into a sample receiving chamber 122 and a filtered sample chamber 124, as illustrated in FIG. 1B. In some embodiments, sample receiving chamber 122 may be preloaded with the nuclease (e.g., deposited on the walls of sample receiving chamber 122, include in a small soluble container inside sample receiving chamber 122, as freeze-dried substrate (lyophilized or cryodesiccated) and the like). In some embodiments, sample receiving chamber 122 may further be preloaded with the markers. In some embodiments, sample receiving chamber 122 may further be preloaded with the bulky molecules. Alternatively, only the bulky molecules may be preloaded to sample receiving chamber 122 and the markers may be preloaded into filtered sample chamber 124 to react with the first portion after filtering.

In some embodiments, the bulky molecule is inert. In some embodiments, the bulky molecule is a bead. In some embodiments, the bulky molecule comprises avidin. In some embodiments, avidin is streptavidin. In some embodiments, the bulky molecule is any molecule too large to pass through the pores of membrane 130. In some embodiments, the marker is a fluorescent marker. In some embodiments, the marker is a phosphorescent marker. In some embodiments, the marker is a colored marker. In some embodiments, the marker is a detectable marker. In some embodiments, the marker is detectable by eye. In some embodiments, the marker is a dye. In some embodiments, the marker is detectable in a reaction. In some embodiments, the marker is a ligand for reaction that produces a signal. In some embodiments, the marker is a substrate for a reaction that produces a signal. In some embodiments, the reaction is a chemical reaction. In some embodiments, the reaction is a biological reaction. For example, horseradish peroxidase is able to oxidize a variety of substrates to produce a signal (e.g., color). Examples of such substrates include, but are not limited to, DAB, ABTS, AEC, AmplexRed, Homovanillic acid, Luminol, OPD and TMB. In some embodiments, the marker produces color in solution. In some embodiments, the marker is a nanoparticle. In some embodiments, the marker comprises gold. In some embodiments, the marker is a gold nanoparticle. In some embodiments, the marker is a fluorophore. In some embodiments, the marker is fluorescent. In some embodiments, the fluorophore is a fluorescent dye. Fluorophores are well known in the art and include for example, FITC, GFP, YFP, RFP, Cy5, Cy7, PerCP, Atto, PerCy5, PerCy7, BODIPY, Pacific Blue, PI, and the various Alexa fluor fluorophores to name but a few. Examples of potential fluorophores can be found for example at: thermofisher.com/il/en/home/life-science/cell-analysis/fluorophores.html, abcam.com/ps/pdf/protocols/Fluorophore%20table.pdf, and en.wikipedia.org/wiki/Fluorophore all of which are hereby incorporated herein by reference. It will be understood that fluorophores have a natural color which can be detected by eye but also can be excited by a laser and their fluorescence can also be detected. Each type of detectable signal may be used as part of the invention. In some embodiments, the target nucleic acid molecule included in the biological sample comprises a capture moiety, and the bulky molecules comprise a capturing moiety and wherein the capture moiety and capturing moiety are configured to bind to each other. In some embodiments, the capture moiety comprises biotin and the capturing moiety comprises avidin. In some embodiments, avidin is selected from streptavidin and neutravidin. Other examples of binding partners include but are not limited to: MS2 and MS2 binding protein (MCP), antibody and antigen, aptamers and their binding target, and the like. In some embodiments, the capture moiety and capturing moiety bind covalently. In some embodiments, the binding pair is not a nucleic acid sequence and its reverse complement. In some embodiments, the capturing moiety is a nucleic acid molecule reverse complementary to the target nucleic acid molecule. In some embodiments, the capturing moiety is perfectly complementary to the target molecule. In some embodiments, the capturing moiety comprises at least 80, 85, 90, 92, 95, 97, 99 or 100% complementarity. Each possibly represents a separate embodiment of the invention. In some embodiments, the capturing moiety comprises at least 5, 7, 10, 12, 15, 17, 20 or 25 complementary bases. Each possibility represents a separate embodiment of the invention.

The term "complementary" refers to the ability of polynucleotides to form base pairs with one another. Base pairs are typically formed by hydrogen bonds between nucleotide units in antiparallel polynucleotide strands. Complementary polynucleotide strands can base pair in the Watson-Crick manner (e.g., A to T, A to U, C to G), or in any other manner that allows for the formation of duplexes. As persons skilled in the art are aware, when using RNA as opposed to DNA, uracil rather than thymine is the base that is considered to be complementary to adenosine. However, when a U is denoted in the context of the present invention, the ability to substitute a T is implied, unless otherwise stated. Perfect complementarity or 100% complementarity refers to the situation in which each nucleotide unit of one polynucleotide strand can hydrogen bond with a nucleotide unit of a second polynucleotide strand. Less than perfect complementarity refers to the situation in which some, but not all, nucleotide units of two strands can hydrogen bond with each other. For example, for two 20-mers, if only two base pairs on each strand can hydrogen bond with each other, the polynucleotide strands exhibit 10% complementarity. In the same example, if 18 base pairs on each strand can hydrogen bond with each other, the polynucleotide strands exhibit 90% complementarity.

In some embodiments, the marker is conjugated to the bulky molecule. In some embodiments, conjugated is bound to. In some embodiments, the bond is a covalent bond. In some embodiments, the bulky molecule comprises a capturing substrate and the marker comprises a capture substrate. Any binding pair known in the art may be used for the capture/capturing substrates. Such binding pairs are well known in the art. In some embodiments, the capture/capturing pair are biotin/avidin. In some embodiments, the marker is biotinylated. In some embodiments, the marker is linked to the capture substrate by a nucleic acid linker. In some embodiments, the linker can be cleaved by the nuclease. In some embodiments, cleavage of the nucleic acid linker by the nuclease releases the marker from the bulky molecule. In some embodiments, the nuclease cleaves single stranded nucleic acid molecules. In some embodiments, the nuclease cleaves double stranded nucleic acid molecules. In some embodiments, the nuclease cleaves DNA. In some embodiments, the nuclease cleaves RNA.

In some embodiments, bulky molecules are bonded to the target nucleic acid molecule in sample receiving chamber 122, to be cleaved by the nuclease into a bulky second portion and the first portion. In some embodiments, prebonded bulky molecules and markers are present in sample receiving chamber 122. In some embodiments, the prebonded molecules and nuclease are present in sample receiving chamber 122 and the nuclease is inactive. In some embodiments, the nuclease is inactive until the target nucleic acid molecule is introduced to sample receiving chamber 122. In some embodiments, the nuclease is inactive until the target nucleic acid molecule is introduced to the nuclease.

In some embodiments, at least one first reaction chamber 120 is in liquid connection to inlet 110, comprising the bulky molecules; and a second reaction chamber (illustrated and discussed with respect to FIGS. 6A and 6B), in liquid connection to the first reaction chamber comprising the nuclease. Therefore, the bulky molecules may be bonded to the target nucleic acid molecule within the first reaction chamber and the target nucleic acid molecule is cleaved from the bulky molecule in the second reaction chamber.

In some embodiments, the solution comprising the biological sample, for example, a biological sample collected from the nostrils and/or the throat, may be introduced into at least one of inlet 110. In some embodiments, solutions from different samples (e.g., from different subjects) may each be introduced to different inlets 110, not illustrated. In some embodiments, the sample is processed. In some embodiments, the sample is not processed. In some embodiments, the processing comprises rupture of intact cells. In some embodiments, the processing comprises isolation of nucleic acid molecules. In some embodiments, the sample does not comprise isolated nucleic acid molecules. In some embodiments, the nucleic acid molecules are washed. In some embodiments, the nucleic acid molecules are mixed in a buffer. In some embodiments, the buffer is a cell lysis buffer. In some embodiments, processing comprises lysing cells in the sample to release nucleic acid molecules. In some embodiments, the buffer is an amplification buffer. In some embodiments, the buffer is a nuclease buffer. In some embodiments, the buffer is a binding buffer. In some embodiments, DNA molecules are converted to RNA molecules by contacting an RNA polymerase. In some embodiments, RNA molecules are converted to DNA molecules by contacting a reverse transcriptase. In some embodiments, the nucleic acid molecules are prebound to the bulky molecule.

In some embodiments, the nuclease is specific to a sequence within the target nucleic acid molecule, for example, the nuclease may be selected from a sequence specific restriction enzyme, TALEN enzymes, zinc finger nuclease, a CRISPR-Cas complex comprising a guide RNA (gRNA) reverse complementary to the sequence within the target nucleic acid molecule and the like. In some embodiments, the nuclease is a CRISPR-Cas complex. In some embodiments, the CRISPR-Cas complex comprises a gRNA specific to the target nucleic acid molecule. In some embodiments, the gRNA is reverse complementary to the target nucleic acid molecule. In some embodiments, reverse complementary is reverse complementary to a target sequence. In some embodiments, the target sequence is within the target nucleic acid molecule.

In some embodiments, first reaction chamber 120 or sample reaction chamber 122 may further include a solution containing single stranded DNA/RNA probes, each bonded to the marker and the bulky molecule, and wherein the nuclease is configured to cleave the single stranded DNA probes only in the presence of the target nucleic acid molecule. In some embodiments, the first reaction chamber 120 or sample reaction chamber 122 may further comprise nucleic acid probes. In some embodiments, the probes are single stranded. In some embodiments, the probes are DNA probes. In some embodiments, the probes are RNA probes. In some embodiments, the probes are a linker between the marker and the bulky molecule. In some embodiments, the nuclease is configured to cleave the probes. In some embodiments, the nuclease cleaves the probes in the presence of the target nucleic acid molecule. In some embodiments, the nuclease has secondary non-specific nuclease ability. Some nucleases known in the art will hybridize to the target nucleic acid molecule, such as by a gRNA, but upon this hybridization will cleave non-target molecules. This secondary nuclease ability can be non-specific and thus will indiscriminately cleave the probes, but only when the nuclease becomes activated by the target sequence. For non-limiting example, type V and type VI CRISPR-Cas complexes have such secondary nuclease ability. In some embodiments, the nuclease is a CRISPR-Cas complex comprising a type V or type VI Cas. In some embodiments, the type V or type VI Cas comprises non-specific nuclease activity. In some embodiments, the type V or VI Cas is selected from Cas12, Cas13, Cas14 and variants, homologs or derivates thereof comprising non-specific nuclease activity. In some embodiments, the nuclease comprises Cas12. In some embodiments, the nuclease is Cas12 and the probe is DNA. In some embodiments, the nuclease is Cas12 and the probe is a single stranded DNA. In some embodiments, the nuclease is Cas12 and the probe is a double stranded DNA. In some embodiments, the nuclease comprises Cas13. In some embodiments, the nuclease is Cas13 and the probe is a single stranded RNA. In some embodiments, the nuclease comprises Cas14. In some embodiments, the nuclease is Cas14 and the probe is a single stranded DNA.

Figure 1D:
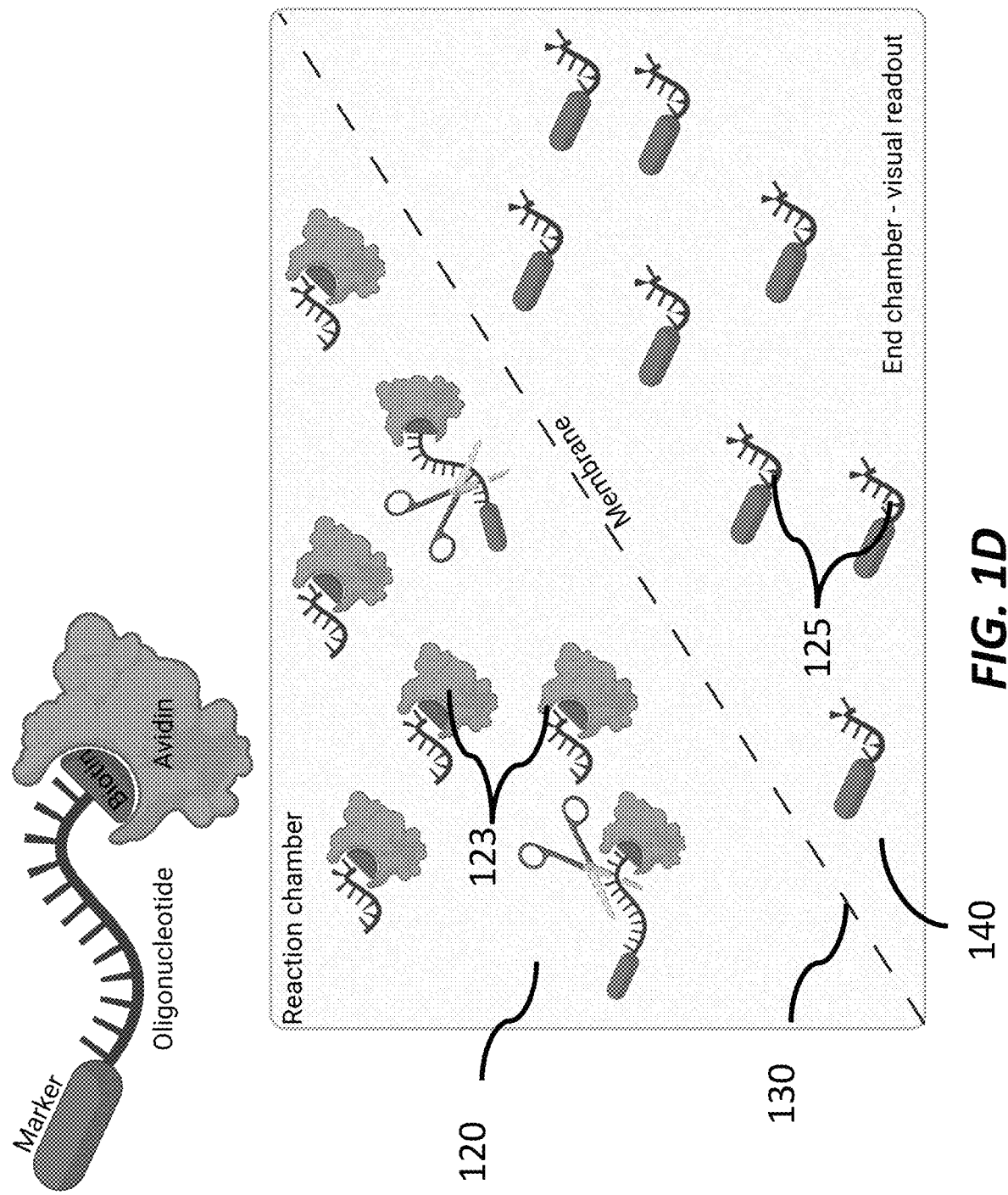
FIGS. 1D and 1E are illustrations of methods of separating a detectable marker from a bulky molecule so that it can traverse a membrane according to some embodiments of the invention.

Reference is now made to FIG. 1D. FIG. 1D shows a cartoon view of the reaction that occurs in reaction chamber 120 in some embodiments of the invention. The marker shown is shown as a purple oval which is linked to a bulky avidin (blue molecule) by a biotinylated single stranded nucleic acid probe/linker. The bulky molecule is too large to pass through membrane 130 (dotted black line) and so the marker is initially trapped as well and cannot cross membrane 130. The nuclease, depicted as a scissor, cuts the probe/linker. This can be through direct recognition of the sequence as a target sequence or through non-specific-secondary cleavage after the nuclease has been activated by the target sequence, thereby forming first portion 125 comprising the markers and second portion 123 comprising the bulky molecule. The cleavage releases the marker from the bulky molecule and the marker is small enough on its own to pass through membrane 130 into informative chamber 140. Thus, the marker membrane 130 (and is subsequently detected) only if the target molecule (e.g., target sequence) is present. The marker can diffuse across the membrane 130 (concentration gradient) but can also be driven across such as by pressure, an electromagnetic field, reverse osmosis, or an electrical field.

Figure 1E:
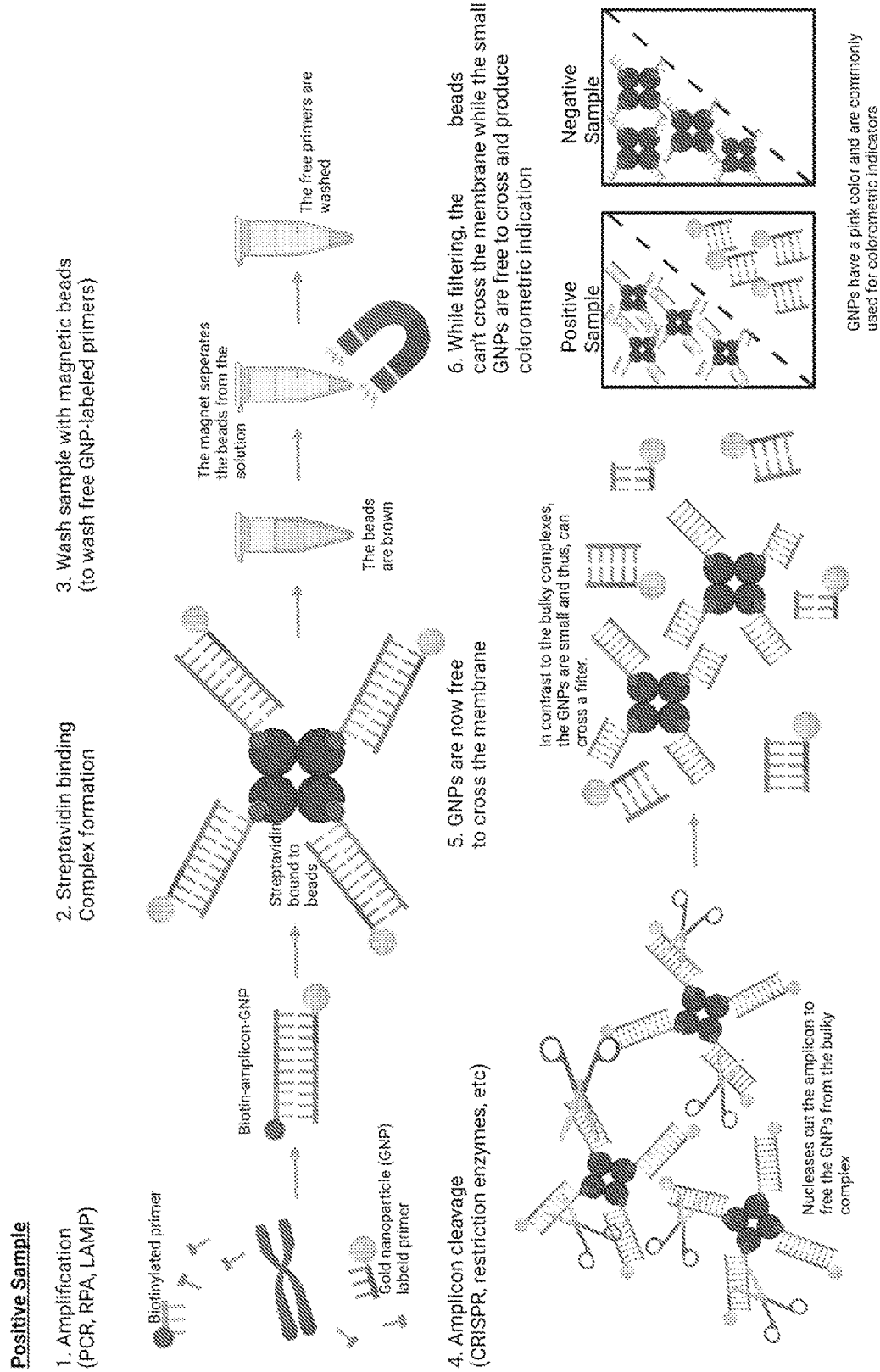

In an alternative embodiment, the marker is linked to the bulky molecule by an amplification reaction. In some embodiments, the amplification is an isothermal amplification. Examples of isothermal reactions include, but are not limited to, Recombinase polymerase amplification (RPA) and Loop-Mediated Isothermal Amplification (LAMP). In some embodiments, the amplification is polymerase chain reaction (PCR). In some embodiments, the amplification comprises a biotinylated primer. In some embodiments, the primer is complementary to the target molecule or to a reverse complement of the target molecule. In some embodiments, the marker is linked to a primer. In some embodiments, the primer is a labeled primer. In some embodiments, the primer is labeled with the marker. In some embodiments, the marker is gold. In some embodiments, the marker is a gold nanoparticle (GNP). In some embodiments, the nanoparticle is not bulky. In some embodiments, the nanoparticle can traverse the membrane. Reference is now made to FIG. 1E. In step (1) amplification occurs with the target nucleic acid molecule as the template for amplification. One primer (e.g., the forward primer) is biotinylated. The other primer (e.g., the reverse primer) is labeled with the marker (a GNP is shown but any marker can be used). After amplification, in step (2) the biotin is bound to a streptavidin bulky molecule (e.g., a bead). These bulky molecules can be in a complex making them even bulkier depending on need, based on the pore size of the membrane. In some embodiments, the beads/bulky molecules are magnetic/paramagnetic. As can be seen in optional step (3) the bulky molecules are isolated removing any free marker or unreacted template. In step (4) the nuclease (shown as a scissor) is specific to the target sequence and cleaves the amplified copies. This releases the marker from the bulky molecule, and it is now free (5) to traverse the membrane (6). In a negative sample no amplification occurs, and the unextended biotinylated primer binds the bulky molecule. There is no target sequence for the nuclease to cleave and no marker can cross the membrane to produce color in the output chamber (6).

In some embodiments, device 100 further comprises a heating element. In some embodiments, the heating element produces a constant temperature. In some embodiments, the heating element is adjacent to reaction chambers 120. In some embodiments, the heating element heats reaction chambers 120. In some embodiments, the heating element heats the solution in reaction chambers 120. The heating element may be used for amplification whether for isothermal amplification or non-isothermal amplification.

In some embodiments, device 100 may include a plurality of reaction chambers 120, as illustrated in FIGS. 1A and 1C, such that each reaction chamber 120 of the plurality comprises a nuclease specific to a different target nucleic acid sequence or configured to cleave the DNA/RNA probes in the presence of a different target nucleic acid molecule. Therefore, if the sample solution includes more than a single target nucleic acid sequence (e.g., target nucleic acid sequences related to different pathogens) each target nucleic acid sequence may be cleaved in a different reaction chamber 120, as at least, some of the reaction chambers 120 include different nuclease or different gRNAs. Alternatively, a single first reaction chamber 120 may include the bulky molecules; and a plurality of second reaction chambers may be in liquid connection to the single first reaction chamber 120. In such case, each reaction chamber of the plurality comprises a nuclease (or gRNA) specific to a different target nucleic acid sequence or configured to cleave the DNA/RNA probes in the presence of a different target nucleic acid molecule. Therefore, device 100 may allow the simultaneous detection of the presence of more than one target nucleic acid sequence in a sample.

In some embodiments, device 100 may further include flushing medium inlets 112 for receiving flushing medium, as illustrated. The flushing medium (e.g., water medium) may allow flushing of the filtered sample solution from filtered sample chamber 124 towards outlet 152. In some embodiments, the sample solution may be delivered from inlet 110 into a plurality of sample-receiving chambers 122 via a network of microchannels 114, formed between body middle part 105b, and body bottom part 105c. In some embodiments, the sample solution may be injected to inlet 110 using a syringe. Such a design forces the sample solution into microchannels 114. Alternatively, microchannels 114 may include a liquid absorbing medium (e.g., a filter paper) and the sample solution may be introduced using capillary forces or a hand operated device (e.g., a squeezing tube). In some embodiments, all microchannels 114 are of similar length and cross-section geometry to maintain a uniform hydrodynamic resistance.

In some embodiments, the flushing medium may be delivered from inlet 112 into a plurality of filtered sample chambers 124 via a network of microchannels 116, formed between body middle part 105b, and body upper part 105a, by either a syringe or capillary forces. In some embodiments, all microchannels 116 are of similar length and cross-section geometry to maintain a uniform hydrodynamic resistance. In some embodiments, the sample solution may be introduced simultaneously with the flushing medium using a double syringe or other hand operated device. In some embodiments, each microchannel 114 may include unidirectional pressure-driven micro-valves 115 and each microchannel 116 may include unidirectional pressure-driven micro-valves 117. The excess flushing medium may exit from outlet. The air from microchannels 114 and 116 may leave device 100 via outlets 150 and 152 respectively.

In the nonlimiting example illustrated in FIGS. 1B and 1C micro-valves 115 and/or 117 are assembled in body middle part 105b.

In some embodiments, pressure-driven micro-valves 115 and/or 117, may each be or may include a gasket. The gasket may be mounted to the middle level, illustrated in FIG. 1C between the upper level and the bottom level. In a nonlimiting example, the gasket may be made from a thermoplastic elastomer (TPE) over molding. The gasket can be pre-dried to residual moister between 0 to 0.4% or any value in between.

In some embodiments, device 100 may further include an informative chamber 140 configured to receive the filtered first portion, having at least one of: a transparent region showing a visible marker, and a detector for detecting the marker. In some embodiments, the marker may be a visible marker, for example, a visibly colored molecule. Therefore, upon bonding of the marker to the first portion of the cleaved target nucleic acid molecule, the solution may be colored with a distinguishable color. Once filtered from the second portion, the first portion bonded to the marker may be visible to the naked eye. In such case, at least one region of device 100 may be transparent, for example, a window above informative chamber 140. In the non-limiting example, of FIGS. 1A, 1B, and 1C, at least the upper level of device 100 (illustrated in FIG. 1C) are made from a transparent polymer. In such case, informative chamber 140 is the filtered sample chamber 124, and any colored solution accumulated in filtered sample chamber 124 is visible to the naked eye. In some embodiments, reaction chamber 120 is not visible through the window. It will be understood that if the marker is a dye it will be colored regardless of which chamber it is in. If the window is positioned such that it can only view the region after the membrane, then the color will only be visible if it can transverse the membrane. Thus, the window or transparency may be offset from the membrane such that only informative chamber 140 is visible and reaction chamber 120 is not visible.

In some embodiments, device 100 is made from an opaque material and may further include a detector 148 for detecting the marker. In such case, the marker may include a magnetic molecule and the detector may detect a change in the magnetic field in the presence of the marker. In another example, the marker may be a conductive molecule and the detector may detect a change in the conductivity/resistivity of the filtered solution in the presence of the marker. In yet another example, the marker may include a molecule configured to emit EM radiation in the non-visible spectrum (e.g., IR, NIR, UV, etc.) and detector 148 may be an emission detector configured to detect the emitted radiation.

In a nonlimiting example, upper part 105a, middle part 105b, and lower part 105c of device 100 are made by one of: injection molding, casting, 3D printing, etc. In some embodiments, each one of upper part 105a, middle part 105b, and lower part 105c may be made or may include polymethylmethacrylate, polystyrene, polycarbonate, polyethylene, polypropylene, polyethylene terephthalate, cyclic olefin copolymer, polyamide and any combination thereof. Each of upper part 105a, middle part 105b, and lower part 105c can be pre-dried to residual moister between 0 to 0.4% or any value in between.

In some embodiments, the device comprises a flat body. In some embodiments, the thickness of the flat body is between 1 to 25, 1 to 30, 1 to 35, 1 to 40, 1 to 45, 1 to 50, 1 to 60, 1 to 70, 1 to 75, 1 to 80, 1 to 90, 1 to 100, 1 to 125, 1 to 150, 1 to 175, 1 to 200, 1 to 300, 1 to 400 or 1 to 500 mm. Each possibility represents a separate embodiment of the invention. In some embodiments, the thickness of the flat body is between 1 to 35 mm. In some embodiments, the thickness of the flat body is between 1 to 100 mm. In some embodiments, the flat body is configured to hold the inlet. In some embodiments, the flat body comprises the inlet. In some embodiments, the flat body is configured to hold the at least one reaction chamber. In some embodiments, the flat body comprises the at least one reaction chamber. In some embodiments, the flat body is configured to hold the membrane. In some embodiments, the flat body comprises the membrane. In some embodiments, the flat body is configured to hold the informative chamber. In some embodiments, the flat body comprises the informative chamber.

Reference is now made to FIGS. 2A, 2B, and 2C which are illustrations of a perspective cross-section view, a cross-section view, and an exploded view, respectively, of another diagnostic device according to some embodiments of the invention. A diagnostic device 200 may include an inlet 210 for receiving a solution comprising a biological sample comprising a target nucleic acid molecule and a reaction chamber 220, in liquid connection to the inlet, comprising a nuclease for cleaving a nucleic acid molecule, into a first portion bonded to a marker and a second portion bonded to a bulky molecule. Reaction chamber 220 may include substantially the same, components, parts, and elements as reaction chamber 120 of device 100.

Device 200 may further include a membrane 230 in liquid connection to reaction chamber 220, having porosity sized to filter the first portion from the solution containing the second portion. Membrane 230 may act as a separation unit configured to separate the first portion from the second portion in the solution. In a nonlimiting example, membrane 230 may include or may be made from Polydimethylsiloxane (PDMS) or other recited materials. A sample solution comprising the target nucleic acid molecule may be injected (e.g., using a syringe) into inlet 210, to be pressed toward reaction chamber 220 for bonding with the bulky molecule and cleaved using the nuclease. The first portion of the cleaved target nucleic acid molecule may bond to a marker and be filtered by membrane 230. The filtered solution may flow towards an informative chamber 240 configured to receive the filtered first portion. In the nonlimiting example illustrated in FIGS. 2A, 2B and 2C, informative chamber 240 has a transparent region 245 (e.g., a transparent window) showing the visible marker.

In some embodiments, membrane 230 may divide reaction chamber 220 into a sample receiving chamber 222 and a filtered sample chamber 224, as illustrated in FIG. 2B. In some embodiments, sample receiving chamber 222 may be preloaded with the nuclease (e.g., deposited on the walls of sample receiving chamber 222, include in a small soluble container inside sample receiving chamber 222 and the like). In some embodiments, sample receiving chamber 222 may further be preloaded with the markers and bulky molecules. Alternatively, only the bulky molecules may be preloaded to sample receiving chamber 222 and the markers may be preloaded into filtered sample chamber 224 to react with the first portion after filtering.

In some embodiments, device 200 may further include flushing medium inlets 212 for receiving flushing medium, as illustrated. The flushing medium may allow flushing the filtered sample solution from chamber 224.

Reference is now made to FIGS. 2D, 2E, and 2F which are illustrations of a perspective cross-section view, a cross-section view, and an exploded view, respectively, of another diagnostic device according to some embodiments of the invention. A diagnostic device 250 may include an inlet 210 for receiving a solution comprising a biological sample comprising a target nucleic acid molecule and a reaction chamber 220, in liquid connection to the inlet, comprising a nuclease for cleaving a nucleic acid molecule, into a first portion bonded to a marker and a second portion bonded to a magnetic bead. In some embodiments, the bulky molecule is a magnetic bead. Device 250 may include substantially the same elements and components of device 200, excluding membrane 230 and therefore also sample receiving chamber 222 and filtered sample chamber 224.

Device 200 may include at least one electromagnet 225 and reaction chamber 220 may include magnetic beads. Electromagnet 225 may act as a separation unit configured to separate the first portion from the second portion in the solution. The magnetic beads may be configured to be bonded to the second portion, optionally the magnetic beads are magnetic bulky molecule. In some embodiments, the target nucleic acid molecule may be cleaved into a first portion bonded to the marker and a second portion bonded to magnetic beads. In some embodiments, after letting the bonding and cleaving reaction a sufficient time (e.g., 5-30 min) at least one electromagnet 225 is activated and capture the magnetic beads on the surface 226 of chamber 220, thus separating the second portion comprising the magnetic beads from the first portion comprising the marker. Therefore, when the solution comprising only the first portion and the marker enters informative chamber 240, the makers are visible/or detectable via transparent region 245 (e.g., a transparent window).

Reference is now made to FIGS. 3A, 3B, and 3C which are illustrations of a perspective cross-section view, a cross-section view, and an exploded view, respectively, of another diagnostic device according to some embodiments of the invention. A diagnostic device 300 may include an inlet 310 for receiving a solution comprising a biological sample comprising a target nucleic acid molecule and a plurality of reaction chambers 320 (e.g., 2, 3, 4 (as illustrated) 5, or more), in liquid connection with single inlet 310. Each one of reaction chambers 320 comprises a nuclease for cleaving a nucleic acid molecule, into a first portion bonded to a marker and a second portion bonded to a bulky molecule. In some embodiments, each one of reaction chambers 320 may have substantially the same structure as reaction chamber 220 of device 200.

In some embodiments, each one of reaction chambers 320 may include a nuclease specific to a different target nucleic acid sequence or configured to cleave the DNA/RNA probes in the presence of a different target nucleic acid molecule. Therefore, if the sample solution includes more than a single target nucleic acid sequence (e.g., the target nucleic acid sequences related to different pathogens) each target nucleic acid sequence may be cleaved in a different reaction chamber 320. Therefore, device 300 may allow the detection of the presence of more than one type of target nucleic acid sequence in a sample.

Device 300 may further include a plurality of membranes 330 each being in liquid connection to a corresponding reaction chamber 320, having porosity sized to filter the first portion from the solution containing the second portion. Membranes 330 may act as separation units configured to separate the first portion from the second portion in the solution. In a nonlimiting example, membranes 330 may include or may be made from Polydimethylsiloxane (PDMS) or other recited materials.

In some embodiments, device 300 may further include a plurality of informative chambers 340 configured to receive the filtered first portion. Information chambers 340 may have substantially the same components and structure as informative chamber 140 or informative chamber 240.

Figure 4E:
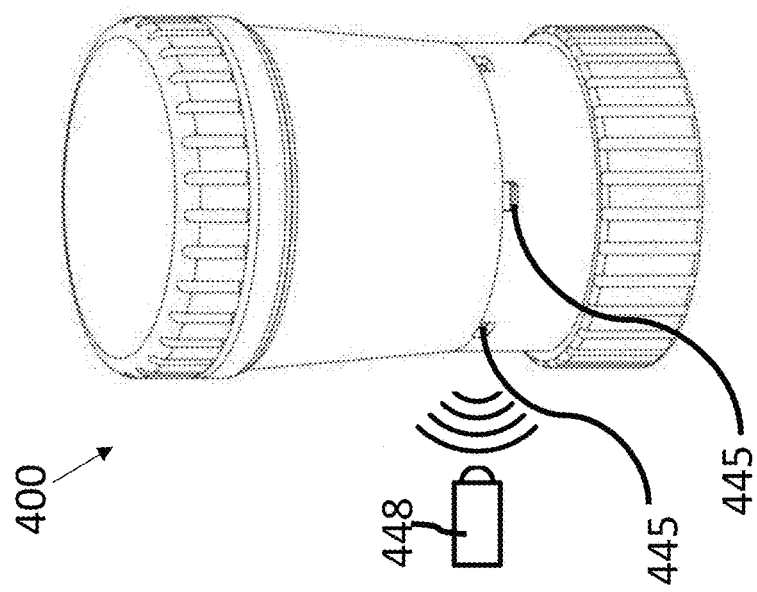
FIGS. 4D and 4E are an exploded view and a perspective view of the container diagnostic device of FIGS. 4A-4C according to some embodiments of the invention.
Figure 4D:
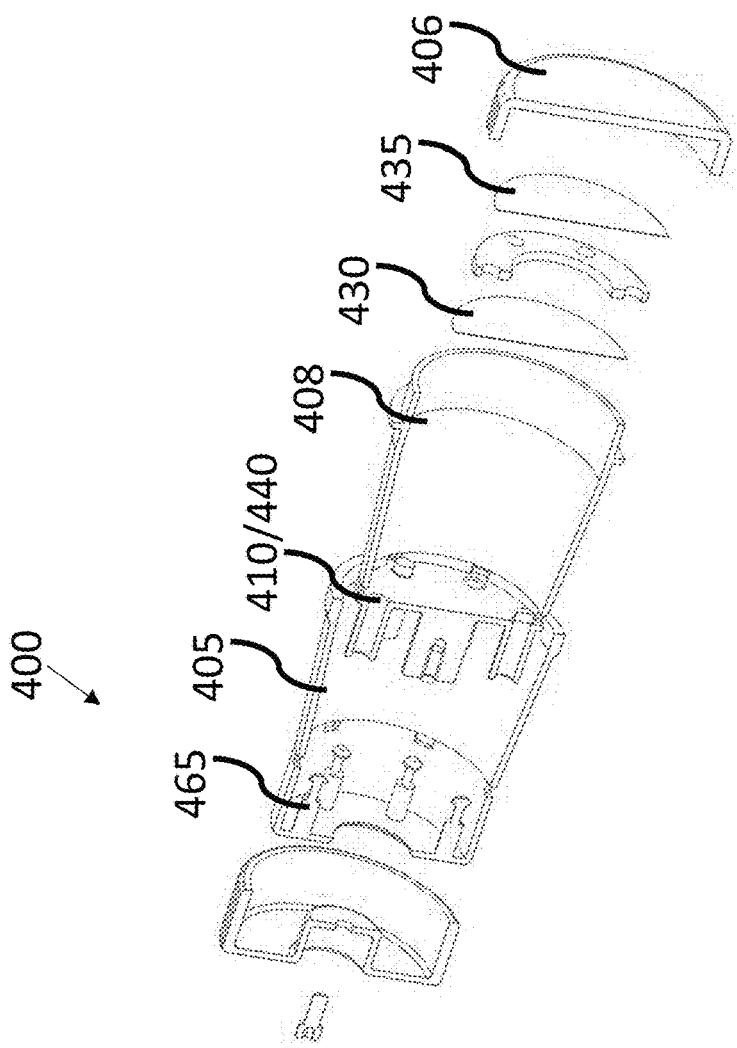

Reference is now made to FIGS. 4A, 4B, and 4C which are cross-section views of container (e.g., urine sample collection container) diagnostic devices according to some embodiments of the invention; and to FIGS. 4D and 4E which are an exploded view and a perspective view of the container diagnostic device of FIGS. 4A-4C according to some embodiments of the invention. A container diagnostic device 400 may include a container 405 for collecting a solution 10 comprising the biological sample, and a sample provision mechanism 460 for controllable delivery of a controlled amount of solution 10 via an inlet 410 to at least one reaction chamber 420. In some embodiments, at least one reaction chamber 420 comprises the nuclease for cleaving the nucleic acid molecule in sample solution 10, into a first portion bonded to a marker and a second portion bonded to a bulky molecule.

Container device 400 may further include a membrane 430 located between inlet 410 and at least one reaction chamber 420. Membrane 430 may act as a separation unit configured to separate the first portion from the second portion in the solution. Membrane 430 may have porosity sized to filter the first portion from the solution containing the second portion. In such case membrane 430 may be configured to allow the sample solution to enter reaction chamber 420, but blocks any molecule bonded to the bulky molecule from existing reaction chamber 420. In some embodiments, device 400 may further include an additional membrane 435, located between inlet 410 and container 405 and configured to filter the target nucleic acid molecule from the solution, prior to entering inlet 410.

In some embodiments, sample provision mechanism 460 may include one or more pistons 465, each being located inside a corresponding reaction chamber and configured to introduce a filtered solution containing said target nucleic acid molecule into least one reaction chamber 420 and to extract said solution comprising said first portion from reaction chamber 420 back into inlet 410. In such case, inlet 410 is the informative chamber 440.

In some embodiments, a sample solution (e.g., urine) may be collected in container 405, as illustrated in FIG. 4A and top lid 406 may be closed. In some embodiments, pistons 465 of sample provision mechanism 460 may be pulled out from chambers 420, for example, by sliding outer cup 408 towards chambers 420, as illustrated in FIG. 4B. During this action sample solution 10 may first be filtered using additional membrane 435, such that only fine molecules comprising the target nucleic acid molecules enter inlet 410. From inlet 410, filtered sample solution 11 may pass membrane 430 and enter reaction chamber 420. Within the reaction chamber an optional amplification may be performed. The amplification products may be bonded to the bulky molecules and then cleaved by the nuclease. Alternatively, the target molecule or the amplification product may be recognized by a nuclease with promiscuous cleavage (e.g., a CRISPR nuclease) and non-specific cleavage of a linker will result in separation of the marker from the bulky molecule. In some embodiments, the first portion of the cleaved target nucleic acid molecule may be bonded to a marker, either in chamber 420 or in inlet 410. In some embodiments, the bonding comprises amplification. In some embodiments, the amplification is amplification with primers comprising the marker. In some embodiments, amplification is amplification with primers comprising a capture moiety and said bulky molecule comprises a capturing moiety.

In some embodiments, pistons 465 may be pulled back into chambers 420, for example, by sliding outer cup 408 from chambers 420, thus, pushing the cleaved solution back into inlet 410, as illustrated in FIG. 4C. Membrane 430 may ensure that only a solution 12 containing the first portion containing the markers can enter inlet 410 which serves also as informative chamber 440. The second portion bonded to the bulky molecules is left in reaction chamber 420. Additional membrane 435 may have a porosity smaller than the size of the first portion when bonded to the markers. In some embodiments, the entire diagnostic process may last no more than 24 hours, for example, 12 hours, 10 hours, 5 hours, 1 hour, 45 minute, 30 minutes, 20 minutes 15 minutes, 10 minutes, 3 minutes, 1 minute, 30 seconds, or any value in-between. A concentrated solution comprising the first portion can be visibly detected via transparent window 445, illustrated in FIG. 4E. Alternatively, a detector may be attached to window 445 for detecting the marker, as discussed herein above.

Figure 5E:
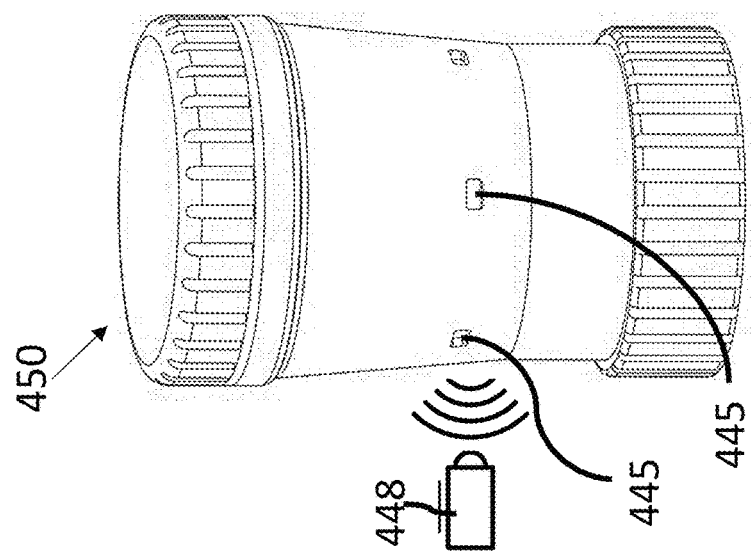
FIGS. 5D and 5E are an exploded view and a perspective view of the container diagnostic device of FIGS. 5A-5C according to some embodiments of the invention.
Figure 5D:
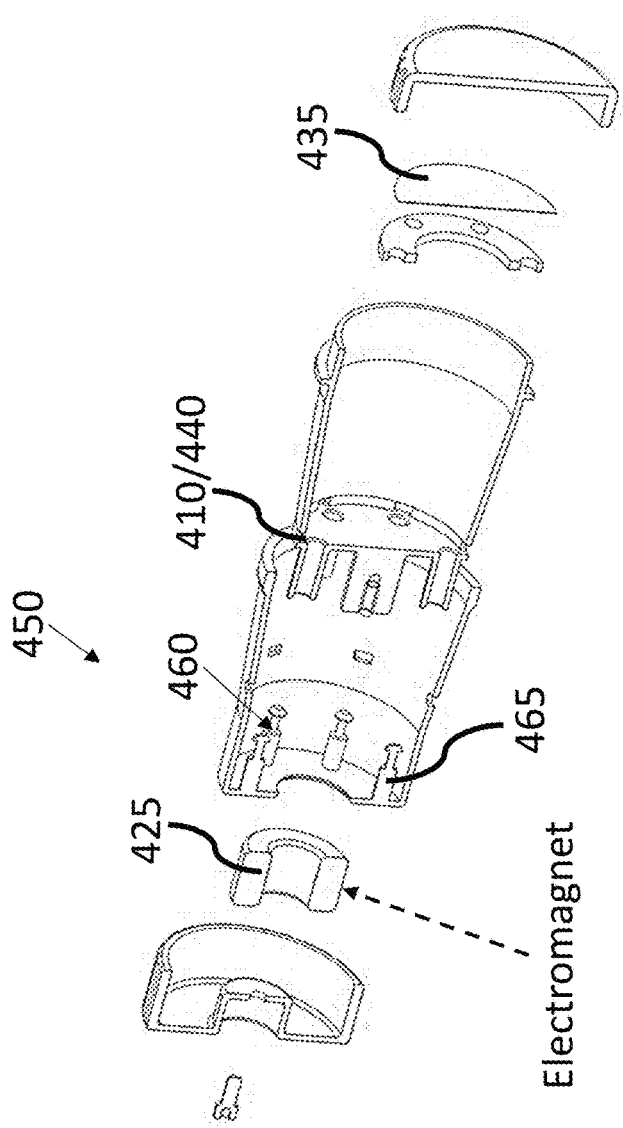

Reference is now made to FIGS. 5A, 5B, and 5C which are cross-section views of container (e.g., urine sample collection container) diagnostic devices according to some embodiments of the invention; and to FIGS. 5D and 5E which are an exploded view and a perspective view of the container diagnostic device of FIGS. 5A-5C according to some embodiments of the invention. A container diagnostic device 500 may include a container 405 for collecting a solution 10 comprising the biological sample, and a sample provision mechanism 460 for controllable delivery of a controlled amount of solution 10 via an inlet 410 to at least one reaction chamber 420. In some embodiments, at least one reaction chamber 420 comprises the nuclease for cleaving the nucleic acid molecule in sample solution 10, into a first portion bonded to a marker and a second portion bonded to a bulky molecule. Device 450 may include substantially the same elements and components of device 400, excluding membrane 430.

In some embodiments, at least one reaction chamber 420 further comprises magnetic beads configured to be bonded to the second portion of the cleaved nucleic acid molecule. In some embodiments, the magnetic beads are magnetic bulky molecules. In some embodiments, the magnetic beads are provided from a magnetic bead reservoir in fluid connection with each reaction chamber 420 or may be preloaded into chamber 420. In such case device, 450 further include at least one electromagnet 425 configured to capture the magnetic beads, thus separating the second portion from the first portion. Electromagnet 425 may act as a separation unit configured to separate the first portion from the second portion in the solution.

In some embodiments, a sample solution (e.g., urine) may be collected in container 405, as illustrated in FIG. 5A and top lid 406 may be closed. In some embodiments, pistons 465 of sample provision mechanism 460 may be pulled out from chambers 420, for example, by sliding outer cup 408 towards chambers 420, as illustrated in FIG. 5B. During this action sample solution 10 may first be filtered using additional membrane 435, such that only fine molecules comprising the target nucleic acid molecules enter inlet 410. From inlet 410, filtered sample solution 11 may enter reaction chamber 420, to be bonded to magnetic beads (e.g., magnetic bulky molecules) and cleaved by the nuclease. In some embodiments, the first portion of the cleaved target nucleic acid molecule may be bonded to a marker, either in chamber 420 or in inlet 410.

In some embodiments, electromagnet 425 is activated, causing the second portion bonded to the magnetic beads to accumulate 428 on the surface of reaction chamber 420, as illustrated in FIG. 5C. In some embodiments, pistons 465 may then be pulled back into chambers 420, for example, by sliding outer cup 408 from chambers 420, thus, pushing a solution comprising mainly the first portion back into inlet 410, as illustrated in FIG. 4C, of device 400. In some embodiments, the entire diagnostic process may last no more than 24 hours, as discussed herein above with respect to the device 400. A solution comprising the first portion can be visibly detected via transparent window 445, illustrated in FIG. 5E. Alternatively, a detector 448 may be attached to window 445 for detecting the marker, as discussed herein above.

Reference is now made to FIGS. 6A and 6B which are illustrations of perspective views and cross-section views of a slidable diagnostic device, during different operation stages, according to some embodiments of the invention. A slidable diagnostic device 500 may include a first reaction chamber 522 formed between a slidable element sliding 502 and a body 505 of diagnostic device 500 and wherein sample inlet 510 is an entrance in body 505. In stage I the solution containing the biological sample is introduced into sample inlet 510.

In some embodiments, sample inlet 510 may receive a solution comprising the biological sample comprising the target nucleic acid molecule, and first reaction chamber 522 may be in liquid connection to the sample inlet 510. First chamber 522 may include a polymerase and primers comprising a capture moiety, wherein the primers comprise a sequence capable of hybridizing to the target nucleic acid molecule. In some embodiments, first chamber 522 comprises primers comprising the marker (e.g., colored primers). In some embodiments, first chamber 522 may further include magnetic beads comprising a capturing moiety configured to capture a captured moiety of the target nucleic acid molecule. In a nonlimiting example, the capturing moiety is streptavidin, and the captured moiety is biotin. In some embodiments, the magnetic bead may be held in a magnetic bead reservoir 525 configured to introduce the magnetic beads into first chamber 522 by sliding slidable element 502 to position magnetic bead reservoir 525 in fluid contact with first chamber 522, as illustrated in stage II. In some embodiments, the magnetic beads comprising the capturing moiety, are magnetic bulky molecules. In some embodiments, device 500 may further include an electromagnet 526 located in the slidable element located at the same location or in close proximity to magnetic bead reservoir 525 allowing the magnetic beads deployment (e.g., when electromagnet 526 is off) and collection (e.g., when electromagnet 526 is on) to and from first chamber 522.

In some embodiments, device 500 may further include at least one second reaction chamber 520 comprising the nuclease located after first reaction chamber 522 in body 505 in the sliding direction. In some embodiments, upon sliding of slidable element 502, magnetic bead reservoir 525 may slide from being in fluid connection with first chamber 522 (in stage II) to being in fluid connection with second chamber 520, as illustrated in stage III. In some embodiments, device 500 may include nuclease solution inlet 512 for loading solution containing the nuclease into at least one second reaction chamber 520. The nuclease solution may be introduced together with the introduction of the sample solution is stage I, or at any one of stage II or stage III. In some embodiments, the nuclease solution may also include the flushing medium.

In some embodiments, device 500 may further include a membrane 530 in liquid connection to at least one second reaction chamber 520, having porosity sized to filter the first portion from the solution containing the second portion. Membrane 530 may act as a separation unit configured to separate the first portion from the second portion in the solution. Membrane 530 may include the same materials as membranes 130, 230, 330, and 430 discussed hereinabove. In some embodiments, device 500 may further include an informative chamber 540 configured to receive the filtered first portion, having at least of a transparent region showing a visible marker, and a detector 548 for detecting the marker, as discussed hereinabove with respect to informative chambers 140, 240, 340, and 440.

In some embodiments, device 500 may further include a piston 545 capable of drawing fluid through membrane 530 and into informative chamber 540, as illustrated in stage IV of the operation of device 500. In some embodiments, if an additional fine membrane 535 is included in device 500, piston 545 may be capable of drawing fluid through both membrane 530 and membrane 535 into informative chamber 540. As should be understood by one skilled in the art, piston 545 is only one optional mechanism for drawing fluid from chamber 520 to chamber 540, and other mechanisms are also within the scope of the invention. For example, informative chamber 540 may include an absorbent, and the fluid may be drawn by capillary forces. In yet another example, informative chamber 540 may include distilled water, and the first portion bonded to the marker may diffuse into informative chamber 540.

Reference is now made to FIGS. 6C and 6D which are illustrations of perspective views and cross-section views of a slidable diagnostic device, during different operation stages, according to some embodiments of the invention. A slidable diagnostic device 600 may include a first reaction chamber 522 formed between a slidable element sliding 502 and a body 505 of diagnostic device 500 and wherein inlet 510 is located at an entrance between slidable element 502 and a wall of body 505. In stage I the solution containing the biological sample is introduced into inlet 510. Slidable diagnostic device 600 may include substantially the same component and elements as slidable diagnostic device 500 excluding membrane 530 and piston 545.

Stages I, II and III of the operation of device 600 may be substantially the same as stages I, II and III of the operation of device 500 discussed herein above. In some embodiments, first chamber 522 may further include magnetic beads comprising a capturing moiety configured to capture a captured moiety of the target nucleic acid molecule. In some embodiments, the magnetic bead may be held in a magnetic bead reservoir 525 configured to introduce the magnetic beads into first chamber 522 by sliding slidable element 502 to position magnetic bead reservoir 525 in fluid contact with first chamber 522, as illustrated in stage II. In some embodiments, the magnetic beads comprising the capturing moiety, are magnetic bulky molecules. In some embodiments, device 600 may further include a first electromagnet 526 located in the slidable element located at the same location or in close proximity to magnetic bead reservoir 525 allowing the magnetic beads deployment (e.g., when electromagnet 526 is off) and collection (e.g., when electromagnet 526 is on) to and from first chamber 522.

In some embodiments, device 600 may further include at least one second reaction chamber 520 comprising the nuclease located after first reaction chamber 522 in body 505 in the sliding direction. In some embodiments, upon sliding of slidable element 502, magnetic bead reservoir 525 may slide from being in fluid connection with first chamber 522 (in stage II) to being in fluid connection with second chamber 520, as illustrated in stage III.

In some embodiments, device 600 may further include a second electromagnet 625 attached to second reaction chamber 520. Second electromagnet 625 may act as a separation unit configured to separate the first portion from the second portion in the solution. In stage IV, after first electromagnet 526 is deactivated, second electromagnet 625 may be activated thus causing the magnetic beads to accumulate 628 on the surface of second reaction chamber 520, separating the second portion from the solution.

In some embodiments, device 500 may further include an informative chamber 540 configured to receive the separated first portion, having at least of a transparent region showing a visible marker, and a detector for detecting the marker, as discussed hereinabove with respect to informative chambers 140, 240, 340, and 440.

By a first aspect, there is provided a device such as described hereinabove. In some embodiments, the device is a diagnostic device. In some embodiments, the device is for use in determining the presence of a target nucleic acid molecule. In some embodiments, the device is a lab on a chip. In some embodiments, the device is suitable for point-of-care or away from a laboratory detection of a target nucleic acid sequence.

In some embodiments, the target nucleic acid is a nucleic acid of an infectious agent. In some embodiments, the infectious agent is a virus. In some embodiments, the infectious agent is a bacterium. In some embodiments, the infectious agent is a fungus. In some embodiments, the infectious agent is a parasite. In some embodiments, the target nucleic acid is a genomic variant. In some embodiments, the target nucleic acid is a genetic marker. In some embodiments, the device is for detecting the target nucleic acid in a sample from a subject. In some embodiments, the device is for detecting the target nucleic acid in an environmental sample. Methods of monitoring infection spread comprising monitoring infectious agent DNA/RNA in the environment (e.g., wastewater) are well known and the device of the invention may be used for such monitoring.

By another aspect, there is provided a method of detecting a target nucleic acid molecule in a sample, the method comprising applying the sample to a diagnostic device of the invention, thereby detecting a target nucleic acid molecule in a sample.

In some embodiments, the applying is via an inlet. In some embodiments, the method comprises detecting the marker in the informative chamber. In some embodiments, the presence of the marker in the informative chamber indicates the presence of the target nucleic acid molecule in the sample. In some embodiments, the device comprises multiple second chambers each comprising a nuclease specific to a different target nucleic acid molecule or configured to cleave the probes in the presence of a different target nucleic acid molecule and wherein the method is a method of simultaneously detecting a plurality of different target nucleic acid molecules. In some embodiments, the different target nucleic acid molecules are different genomic variants or markers. In some embodiments, the different target nucleic acid molecules are from different organisms. In some embodiments, the different target nucleic acid molecules are from different infectious agents.

In some embodiments, the sample is a biological sample. In some embodiments, the sample is an environmental sample. In some embodiments, the sample is from a subject. In some embodiments, the sample comprises a biological fluid. In some embodiments, the sample comprises cells. In some embodiments, the sample is from a subject, the target nucleic acid molecule is from a pathogen and the method is a method of diagnosing a pathogenic infection of the subject. In some embodiments, the sample is from a subject, the target nucleic acid molecule is from a microbe and the method is a method of diagnosing a microbial infection of the subject. In some embodiments, the sample is from a subject, the target nucleic acid molecule is genomic variant or marker and the method is a method of identifying a genomic variant or marker in the subject. In some embodiments, the sample is from the environment, the target nucleic acid molecule is from an organism and the method is a method of identifying the presence of the organism in the environment. In some embodiments, the organism is a microbe. In some embodiments, the organism is a pathogen. In some embodiments, the organism is an infectious agent. In some embodiments, the sample is wastewater. In some embodiments, the organism is a genetic variant.

By another aspect, there is provided a method of detecting a target nucleic acid molecule, the method comprising:
  a. introducing the target nucleic acid molecule into a first solution wherein the solution comprises:
    i. a CRISPR enzyme and a guide RNA (gRNA) specific to the target nucleic acid; and
    ii. a bulky molecule linked via a nucleic acid linker to a detectable moiety;
  b. isolating detectable moiety not linked to the bulky molecule;
  thereby detecting a target nucleic acid molecule.

By another aspect, there is provided a method of detecting a target nucleic acid molecule, the method comprising introducing the target nucleic acid molecule into a first solution on a first side of a membrane, wherein the solution comprises:
  i. a CRISPR enzyme and a guide RNA (gRNA) specific to the target nucleic acid; and
  ii. a bulky molecule linked via a nucleic acid linker to a detectable moiety;
  and detecting the detectable moiety in a second solution on a second side of the membrane; thereby detecting a target nucleic acid molecule.

By another aspect, there is provided a method of detecting a target nucleic acid molecule, the method comprising:
  a. amplifying a target nucleic acid molecule with a primer pair to produce an amplification product, wherein the primer pair comprises a first primer comprising a detectable moiety and a second primer comprising a capture moiety;
  b. contacting the amplification product with a bulky molecule comprising a capturing moiety, to produce a captured amplification product;
  c. introducing the captured amplification product into a first solution comprising an enzyme capable of cleaving the target nucleic acid molecule; and
  d. isolating detectable moiety not linked to the bulky molecule;
  thereby detecting a target nucleic acid molecule.

By another aspect, there is provided a method of detecting a target nucleic acid molecule, the method comprising:
  a. amplifying a target nucleic acid molecule with a primer pair to produce an amplification product, wherein the primer pair comprises a first primer comprising a detectable moiety and a second primer comprising a capture moiety;
  b. contacting the amplification product with a bulky molecule comprising a capturing moiety, to produce a captured amplification product;
  c. introducing the captured amplification product into a first solution on a first side of a membrane, in the presence of an enzyme capable of cleaving the target nucleic acid molecule; and
  d. detecting the detectable moiety in a second solution on a second side of the membrane;
  thereby detecting a target nucleic acid molecule.

In some embodiments, the method further comprises receiving a sample. In some embodiments, the sample comprises the target nucleic acid molecule. In some embodiments, the sample is from a subject. In some embodiments, the sample is a sample suspected of containing the target nucleic acid molecule. In some embodiments, the sample is an unprocessed sample. In some embodiments, the sample is processed. In some embodiments, the sample is a liquid. In some embodiments, the sample is dissolved in a liquid. In some embodiments, the liquid is a buffer.

In some embodiments, the amplification is an isothermal amplification. Examples of amplification include, but are not limited to, PCR, RPA, and LAMP, however, any amplification may be employed. In some embodiments, the amplification occurs before introduction into the first solution. In some embodiments, the amplification occurs in the first solution. In some embodiments, the amplification is performed in the presence of any reagents needed for amplification (e.g., nucleotides, polymerase, ions, etc.).

It will be understood by a skilled artisan that the amplification produces a product with the detectable moiety at one end, the capture moiety at the other end and the sequence of the target molecule in the middle. In some embodiments, the amplification product is double stranded. In some embodiments, the capture moiety is capable of binding the capturing moiety. In some embodiments, the capturing moiety is capable of binding the capture moiety. In some embodiments, the capturing moiety and capture moiety are a binding pair. In some embodiments, the binding is covalent. In some embodiments, the binding is not hybridization of complementary nucleic acid sequences. In some embodiments, the capture moiety and capturing moiety are configured to bind to each other.

In some embodiments, the contacting with a bulky molecule occurs before introduction into the first solution. In some embodiments, the bulky molecule is in the first solution. It will be understood by a skilled artisan that once the amplification product is captured onto the bulky molecule it will not be able to traverse the membrane. Cleavage of the target nucleic acid molecule, however, frees the detectable moiety from the bulky molecule and the detectable moiety is than then able to traverse the membrane.

In some embodiments, the first solution is an aqueous solution. In some embodiments, the first solution is a salt solution. In some embodiments, the first solution is a buffer. In some embodiments, the first solution is a solution suitable for complexion of the CRISPR enzyme with the gRNA. In some embodiments, the solution is suitable for hybridization of the gRNA to the target nucleic acid molecule. In some embodiments, the solution is suitable for activation of the CRISPR enzyme. In some embodiments, the solution is suitable for cleavage of the nucleic acid linker by the CRISPR. In some embodiments, the solution is suitable for nuclease activity. In some embodiments, the solution is suitable for cleavage of the target nucleic acid molecule. In some embodiments, the solution is suitable for function of a restriction enzyme.

In some embodiments, the membrane is a porous membrane. In some embodiments, the membrane is a film. In some embodiments, the membrane is a filter. In some embodiments, the membrane comprises a plurality of pores. Examples of materials which can be used to produce the membrane include, but are not limited to, polytetrafluoroethylene polymer (PTFE), Polyethersulfone, nylon, regenerated cellulose, PVDF, alumina based, cellulose acetate, polypropylene, anopore, cellulose, polysulfone and PDMA. In some embodiments, the membrane is a PTFE membrane.

In some embodiments, the CRISPR enzyme is in complex with the gRNA. In some embodiments, the gRNA is suitable to complex with the CRISPR enzyme. In some embodiments, the CRISPR enzyme is a Cas enzyme. In some embodiments, the CRISPR enzyme comprises promiscuous nuclease activity. In some embodiments, the promiscuous activity is induced upon activation of the enzyme. In some embodiments, activation occurs when the gRNA in complex with the CRISPR enzyme hybridizes to the target nucleic acid molecule. In some embodiments, the enzyme is a type V CRISPR-Cas. In some embodiments, the enzyme is a type VI CRISPR-Cas. In some embodiments, promiscuous nuclease activity is secondary nuclease activity. It will be understood by a skilled artisan that promiscuous/secondary nuclease activity refers to a CRISPR-Cas complex that upon binding to its target molecule via a gRNA also begins non-specifically cleaving other, non-target, nucleic acid molecules. This non-specific nuclease activity is well known in the art for certain CRISPR-Cas complexes. In some embodiments, the enzyme is Cas12 and the linker is DNA. In some embodiments, the enzyme is Cas13 and the linker is RNA. In some embodiments, the enzyme is Cas14 and the linker is DNA. In some embodiments, the linker is single stranded. In some embodiments, the linker is double stranded. It will be understood by a skilled artisan that release of the detectable marker by promiscuous nuclease activity provides the advantage of increasing the signal. Even a single target molecule will activate the CRISPR enzyme and result in the secondary cleavage of more than one linker and the freeing of more than one detectable moiety. Thus, this embodiment naturally amplifies the signal but without the need to amplification of the target nucleic acid molecule. PCR amplification (and other DNA/RNA amplification methods) introduce bias and errors into the detection. Further, they require an added step that can be difficult or expensive to integrate into a LOC setup. Thus, a method (such as provided herein) that does not require nucleic acid amplification is advantageous. The amplification of signal produced by the promiscuous cleavage helps lower the threshold of detection without the need for DNA/RNA amplification.

In some embodiments, the enzyme is a CRISPR enzyme, and the gRNA is specific to the target nucleic acid molecule. In some embodiments, the CRISPR is a CRISPR-Cas. In some embodiments, the Cas is Cas9. In some embodiments, the CRISPR enzyme does not comprise promiscuous activity and cleaves only the target nucleic acid molecule. In some embodiments, the enzyme is a nuclease. In some embodiments, the enzyme is a restriction enzyme. In some embodiments, the restriction enzyme is selected to cut only the target nucleic acid molecule and not a primer. Restriction enzymes are sequence specific and cut only at short known (often palindromic) sequences. The target sequence to be amplified can be selected along with the restriction enzyme such that the target sequence will be cut at least once by the enzyme. Similarly, the primers which are used to amplify the target sequence can be designed such that the target sequence of the restriction enzyme is not present and the primers themselves would not be cleaved. Alternatively, the cleavage can be designed within the primers.

In some embodiments, the free primers are not contacted with the bulky molecule. In some embodiments, the free primers are not contacted with the first solution. In some embodiments, the free primers are not contacted with the enzyme. In some embodiments, the method further comprises isolating the amplification product. In some embodiments, the method further comprises isolating the bulky molecule. In some embodiments, the bulky molecule is a bead and the method comprises isolating the bead. In some embodiments, the bulky molecule is an artificial scaffold and the method comprises isolating the artificial scaffold. In some embodiments, the bulky molecule is magnetic and the method further comprises isolating the bulky molecule by applying a magnetic field. In some embodiments, the magnetic is paramagnetic. In some embodiments, the method further comprises washing the isolated product. In some embodiments, the method further comprises washing the isolated bulky molecule. It will be understood that washing and/or isolating will remove free primers that were not incorporated into an amplification product.

In some embodiments, the bulky molecule is larger than a pore of the membrane. In some embodiments, the bulky molecule is larger than all pores of the membrane. In some embodiments, the bulky molecule is sufficiently bulky so as to be unable to traverse the membrane. In some embodiments, the bulky molecule is sufficiently bulky so as to be unable to pass through the membrane. In some embodiments, the detectable moiety is smaller than a pore of the membrane. In some embodiments, the detectable moiety is able to traverse the membrane. In some embodiments, the detectable moiety is sufficiently small as to be able to pass through the membrane. In some embodiments, the detectable moiety and the linker together are smaller than a pore of the membrane. In some embodiments, the detectable moiety and the linker together are sufficiently small as to be able to pass through the membrane. It will be understood by a skilled artisan that the bulky molecule, detectable moiety and membrane are selected such that the bulky molecule (and anything connected to it) cannot pass through the membrane while the detectable moiety once cleaved from the bulky molecule will pass. Cleavage may result in some of the linker remaining attached to the detectable moiety, but the membrane should be selected such that detectable moiety can still pass through. In some embodiments, the detectable moiety is a marker.

In some embodiments, presence of isolated detectable molecule not linked to the bulky molecule indicates the presence of the target nucleic acid molecule. In some embodiments, isolating the detectable molecule comprises removing the bulky molecule from the solution. In some embodiments, the bulky molecule is removed by sedimentation. In some embodiments, the bulky molecule is removed by a magnetic field. In some embodiments, the bulky molecule is removed by filtration. In some embodiments, the solution is passed through a filter and the presence of the detectable moiety/marker in the filtered solution indicates detectable moiety/marker not linked to the bulky molecule. In some embodiments, the filter comprises a pore size sufficiently small so as not to allow the bulky molecule to pass through the filter. In some embodiments, the bulky molecule is removed by a membrane between the first and second solution. In some embodiments, isolating the detectable molecule comprises to first solution being on a first side of a membrane and the detectable moiety being sufficiently small to be able to pass through the membrane to a second solution on a second side of the membrane.

In some embodiments, the second solution is the same solution as the first solution. In some embodiments, the second solution is a different solution than the first solution. In some embodiments, the detectable marker traverses the membrane by diffusion. In some embodiments, the detectable marker traverses the membrane by a concentration gradient. In some embodiments, a force is applied to drive the detectable moiety through the membrane. In some embodiments, the method comprises applying the force. Examples of such a driving force include, pressure, a magnetic field, reverse osmosis and an electrical field. In some embodiments, the detectable moiety is charged.

In some embodiments, detection of the detectable moiety in the second solution indicates detection of the target nucleic acid molecule. In some embodiments, the presence of the detectable moiety in the second solution indicates the presence of the target nucleic acid molecule. In some embodiments, the presence of the detectable moiety in the second solution indicates the presence of the target nucleic acid molecule in the sample. In some embodiments, the detecting is by eye. In some embodiments, the detecting is with a detector. It will be understood by a skilled artisan that some detectable moieties are visually detectable such as a dye, a gold nanoparticle (produces color) or a fluorophore with a natural color. Other detectable moieties may require a specific detection apparatus (i.e., a detector). For examples, fluorophores may be detectable by fluorescence produced after excitation, an infrared or ultraviolet molecule requires a detector configured for measuring radiation that such a wavelength, a radioactive moiety would require a detector configured to detect radiation and the like. It will be understood that the method that includes amplification of the target nucleic acid molecule has a double protection against false positives. Firstly, without amplification the detectable moiety cannot bind to the bulky molecule. Thus, if amplification does not occur when free primers are removed the possibility of a detectable signal is removed and the sample will be found negative for the target nucleic acid molecule. For this reason, the primers should be designed such that they are specific to the target nucleic acid molecule and so that there is not non-specific or off-target binding/amplification. However, even if some off-target amplification occurred the use of the enzyme adds synergistic protection against false positives. The enzyme is sequence specific against the target molecule and if an incorrect amplification occurred there still would not be cleavage. Without cleavage the detectable moiety, though transferred to the first solution is trapped there and cannot traverse to the second solution. This highlights the advantage of having the enzyme not cleave within the primer sequence, as in such a case it might still cleave an erroneous amplification product produced by off-target binding. If however, the enzyme cleaves in the sequence between the primers it is unlikely to also cleave an irrelevant, erroneously amplified, sequence.

In some embodiments, the method further comprises amplifying at least a portion of the target nucleic acid molecule. In some embodiments, the amplifying is prior to the applying of the nuclease. In some embodiments, amplifying is within the first chamber. In some embodiments, the amplifying is with a primer comprising the marker. In some embodiments, the amplifying is with nucleotides comprising the marker. In some embodiments, the amplifying is with primers comprising a capture moiety. In some embodiments, the amplifying is with nucleotides comprising a capture moiety. In some embodiments, the bulky molecule comprises a capturing moiety.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A diagnostic device, comprising:
a body comprising:
an inlet for receiving a solution comprising a biological sample comprising a target nucleic acid molecule;
a plurality of reaction chambers, in liquid connection to the inlet, preloaded with nucleases capable of cleaving a nucleic acid molecule, into a first portion and a second portion;
a membrane placed between said plurality of reaction chambers and an informative chamber;
one or more valves located prior to said membrane,
and wherein said membrane has porosity sized to filter out molecules;
and wherein said informative chamber is configured to receive the filtered first portion, and wherein said informative chamber has at least one of,
a transparent region; and
a detector for detecting the marker.

2. The diagnostic device of claim 1, wherein the plurality of reaction chambers comprise two chambers:
a first reaction chamber, in liquid connection to the inlet, comprising the bulky molecules; and
a second reaction chamber, in liquid connection to the first reaction chamber, comprising the nuclease.

3. The diagnostic device of claim 2, wherein the first reaction chamber is preloaded with bulky molecules and said bulky molecules are bonded to the target nucleic acid molecule within the first reaction chamber and the nuclease is preloaded in the second reaction chamber and the target nucleic acid molecule is cleaved in the second reaction chamber.

4. The diagnostic device of claim 3, wherein said target nucleic acid molecule comprises a capture moiety and said bulky molecules and said second reaction chamber is preloaded with a capturing moiety and wherein said capture moiety and capturing moiety are configured to bind to each other.

5. The diagnostic device of claim 1, wherein the nuclease is specific to a sequence within the target nucleic acid molecule.

6. The diagnostic device of claim 1, wherein the plurality of reaction chambers are further preloaded with single stranded DNA/RNA probes, each bonded to a marker and a bulky molecule, and wherein the nuclease cleaves the single stranded DNA probes only in the presence of the target nucleic acid molecule.

7. The diagnostic device of claim 1, comprising a plurality of parallel reaction chambers, each being in liquid connection to the inlet, wherein each reaction chamber of said plurality comprises a nuclease specific to a different target nucleic acid sequence or configured to cleave preloaded DNA/RNA probes in the presence of a different target nucleic acid molecule.

8. The diagnostic device of claim 1, comprising a single first reaction chamber, in liquid connection to the inlet, preloaded with bulky molecules; and a plurality of second reaction chambers, in liquid connection to the single first reaction chamber, wherein each reaction chamber of said plurality of second reaction chambers is preloaded with a nuclease specific to a different target nucleic acid sequence or configured to cleave DNA/RNA probes in the presence of a different target nucleic acid molecule.

9. The diagnostic device of claim 1, wherein said one or more valves are located at an entrance to each reaction chamber.

10. The diagnostic device of claim 1, further comprising a flat body configured to hold the inlet, the plurality of reaction chambers, the membrane and the informative chamber, wherein the thickness of the flat body is between 1 to 100 mm.

11. The diagnostic device of claim 1, further comprising:
a container for collecting the solution comprising the biological sample and wherein said membrane is located between said inlet and said plurality of reaction chambers; and an additional membrane, located between said inlet and said container and configured to filter the target nucleic acid molecule from the solution, prior to entering said inlet.

12. The diagnostic device of claim 11, further comprising a sample provision mechanism that includes one or more pistons, each being located inside a corresponding reaction chamber and configured to introduce a filtered solution containing said target nucleic acid molecule into said plurality of reaction chambers and to extract said solution comprising said first portion from said plurality of reaction chambers back into the inlet.

13. The diagnostic device of claim 1, further comprising a first chamber formed between a slidable element sliding over the body of the diagnostic device and wherein the inlet being a sample inlet is an entrance in the body.

14. The diagnostic device of claim 13, wherein the first chamber is preloaded with a polymerase and primers comprising a capture moiety, wherein said primers comprise a sequence capable of hybridizing to said target nucleic acid molecule and wherein said first chamber is preloaded with primers comprising said marker.

15. The diagnostic device of claim 13, wherein the first chamber is preloaded with magnetic beads comprising a capturing moiety, optionally wherein said magnetic bead is a bulky molecule comprising a magnetic moiety,
and wherein the devices further comprises:
a magnetic bead reservoir for introducing magnetic beads into the first chamber comprising the solution comprising the biological sample, by sliding the slidable element to position the magnetic bead reservoir in fluid contact with said first chamber, optionally wherein said magnetic beads comprise a capturing moiety.

16. The diagnostic device of claim 13, further comprising:
an electromagnet located in the slidable element located at the same location as the magnetic bead reservoir;
at least one second reaction chamber preloaded with the nuclease located after the first reaction chamber in the body in the sliding direction; and
a piston capable of drawing fluid through said membrane and into said informative chamber.

* * * * *